United States Patent [19]
Komma et al.

[11] Patent Number: 5,644,413
[45] Date of Patent: Jul. 1, 1997

[54] OPTICAL HEAD FOR ADJUSTING A POSITIONAL RELATION BETWEEN THE INFORMATION MEDIUM AND THE OPTICAL HEAD

[75] Inventors: Yoshiaki Komma, Kyoto; Sadao Mizuno, Osaka; Makoto Kato, Nishinomiya; Hidenori Wada; Seiji Nishino, both of Osaka, all of Japan

[73] Assignee: Matsushita Electric Industrial Co., Ltd., Osaka, Japan

[21] Appl. No.: 501,351

[22] Filed: Jul. 12, 1995

Related U.S. Application Data

[63] Continuation of Ser. No. 100,936, Aug. 3, 1993, abandoned.

[30] Foreign Application Priority Data

Aug. 7, 1992 [JP] Japan .................................. 4-211108

[51] Int. Cl.$^6$ ...................................................... G02B 5/32
[52] U.S. Cl. ........................... 359/19; 359/569; 359/900; 369/44.12; 369/112
[58] Field of Search ..................... 359/16, 19, 569, 359/900; 369/44.23, 44.12, 112

[56] References Cited

U.S. PATENT DOCUMENTS

| | | | |
|---|---|---|---|
| 3,125,626 | 3/1964 | Miles | 359/723 |
| 4,776,652 | 10/1988 | Ih | 359/16 |
| 4,832,464 | 5/1989 | Kato et al. | 359/565 |
| 4,885,734 | 12/1989 | Yuzo | 359/569 |
| 4,929,044 | 5/1990 | Arimoto et al. | 385/7 |
| 4,929,823 | 5/1990 | Kato et al. | 369/45 |
| 5,015,835 | 5/1991 | Ohuchida et al. | 369/44.23 |
| 5,062,098 | 10/1991 | Hori et al. | 369/44.12 |
| 5,085,496 | 2/1992 | Yoshida et al. | 359/569 |
| 5,105,403 | 4/1992 | Kando et al. | 369/44.12 |
| 5,111,448 | 5/1992 | Komma et al. | 369/44.23 |
| 5,148,314 | 9/1992 | Chen | 359/16 |

(List continued on next page.)

FOREIGN PATENT DOCUMENTS

| | | | |
|---|---|---|---|
| 0359179 | 3/1990 | European Pat. Off. | G02B 5/18 |
| 0452793 | 10/1991 | European Pat. Off. | G11B 7/12 |
| 3421705 | 4/1986 | Germany | G02B 13/24 |
| 61-189504 | 8/1986 | Japan | G02B 5/18 |
| 1-298540 | 12/1989 | Japan | 359/44.23 |
| 2185722 | 7/1990 | Japan | G11B 7/09 |
| 3-173942 | 7/1991 | Japan | G11B 7/09 |
| 3155514 | 7/1991 | Japan | G02B 13/18 |
| 3155515 | 7/1991 | Japan | G02B 13/18 |
| 4-050813 | 2/1992 | Japan | G02C 7/02 |

OTHER PUBLICATIONS

"Optical Design With Diffractive Lenses" by Dean Faklis et al: Photonics Spectra: Nov., 1991: pp., 205–208.

(List continued on next page.)

*Primary Examiner*—James Phan
*Assistant Examiner*—John Juba, Jr.
*Attorney, Agent, or Firm*—Lowe, Price, LeBlanc & Becker

[57] ABSTRACT

An optical head apparatus consists of a semiconductor laser for radiating a light beam, a first collimator lens for collimating the light beam, a wedge-like prism for reshaping the light beam, a beam splitter for transmitting the light beam in an outgoing path and splitting the light beam in an incoming path, an objective lens for converging the light beam at an information medium in which information is stored, a plane type of hologram lens integrally formed with the objective lens for excessively correcting chromatic aberration of the objective lens to cancel out chromatic aberration of the collimator lens, a second collimator lens for converging the light beam split, a photo detector for detecting intensity of the light beam converged to obtain an information signal and servo signals, and an actuating unit for slightly moving the objective lens and the hologram lens according to the servo signals. A wavelength of the light beam is lengthened as intensity of the light beam is increased. Even though an astigmatic difference occurs in the semiconductor laser, the change of a focal length of the collimator lens cancels out the change of the astigmatic difference to prevent the occurrence of astigmatic aberration.

38 Claims, 13 Drawing Sheets

U.S. PATENT DOCUMENTS

| | | | |
|---|---|---|---|
| 5,161,040 | 11/1992 | Yokoyama et al. | 359/19 |
| 5,202,867 | 4/1993 | Matsui et al. | 369/44.23 |
| 5,212,572 | 5/1993 | Krantz et al. | 359/16 |
| 5,257,131 | 10/1993 | Yoshida et al. | 359/569 |
| 5,301,182 | 4/1994 | Komma et al. | 369/44.23 |
| 5,303,221 | 4/1994 | Maeda et al. | 369/112 |
| 5,321,550 | 6/1994 | Maruyama et al. | 369/44.39 |
| 5,349,471 | 9/1994 | Morris et al. | 359/569 |
| 5,391,865 | 2/1995 | Kurata et al. | 369/44.23 |
| 5,493,555 | 2/1996 | Kimura et al. | 369/112 |

OTHER PUBLICATIONS

"Diffractive Lenses in Broadband Optical System Design" by Dean Faklis et al: Photonics Spectra: Dec., 1991: pp., 131–134.

"Design of Some Achromatic Imaging Hybrid Diffractive–Refractive Lenses" by P. Twardowski et al: SPIE vol. 1507 Holographic Optics III: Principles and Applications (1991): pp., 55–65.

"APO–Tele Lenses with Kinoform Elements" by M.A. Gan et al: SPIE vol. 1507 Holographic Optics III; Principles and Applications (1991): pp., 116–125.

"Spherical Grating Objective Lenses for Optical Disk Pickups" by K. Goto et al: Japanese Journal of Applied Physics, vol. 26 (1987) Supplement 26–4: pp., 135–140.

Proceedings of the SPIE vol. 396, 20 Apr., 1983, Geneva, Switzerland; pp. 173–180 I. Weingartner et al "Holographic video Disc and Laser Scanning Optics".

LITHOGRAPHY

DEVELOPMENT

RESIST STRIPPING

LITHOGRAPHY

DEVELOPMENT

RESIST STRIPPING

VERTICAL DIRECTION

HORIZONTAL DIRECTION

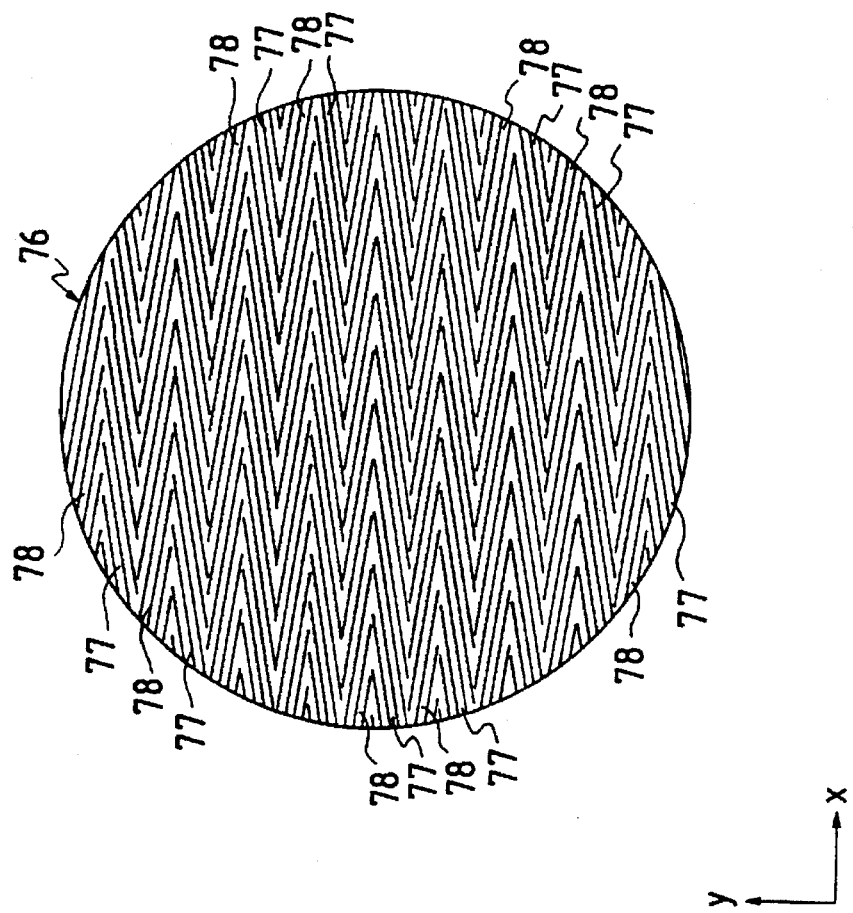
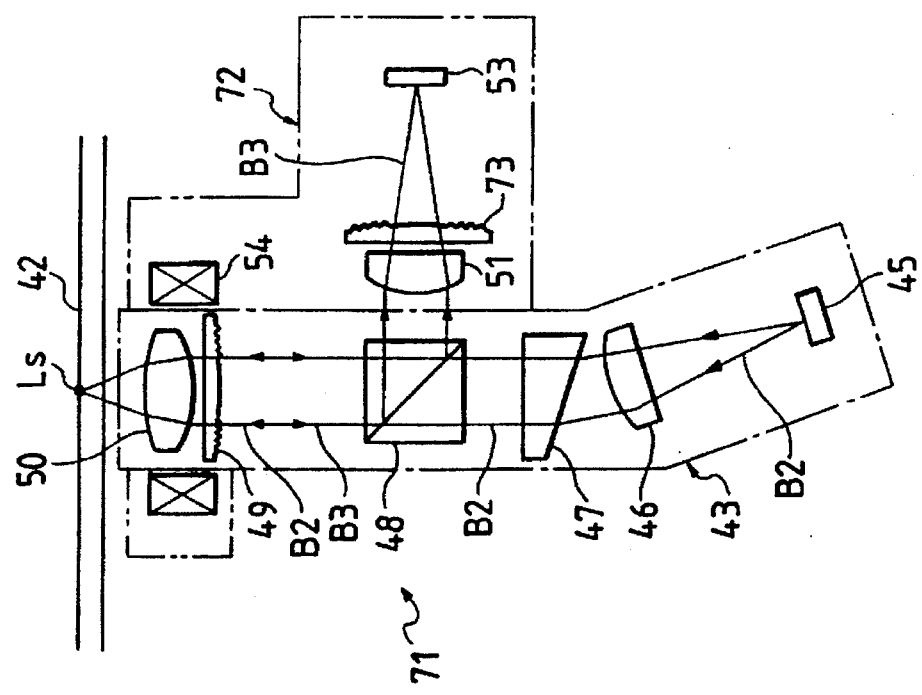

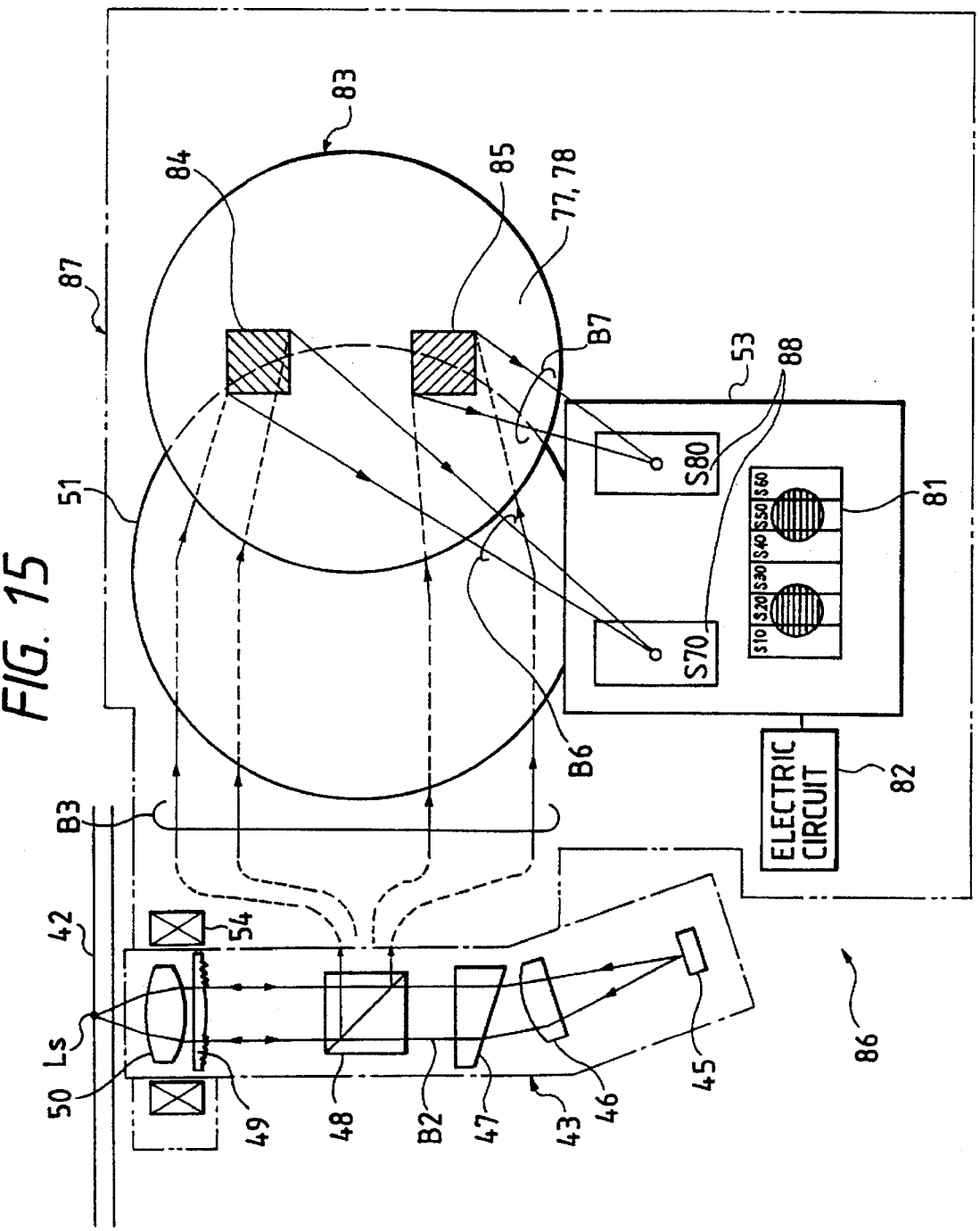

→ OUTGOING LIGHT PATH
← INCOMING LIGHT PATH

→ OUTGOING LIGHT PATH
← INCOMING LIGHT PATH

OPTICAL HEAD FOR ADJUSTING A POSITIONAL RELATION BETWEEN THE INFORMATION MEDIUM AND THE OPTICAL HEAD

This application is a continuation of application Ser. No. 08/100,936 filed Aug. 3, 1993, abandoned.

BACKGROUND OF THE INVENTION

1. Field of the Invention

The present invention relates to an image-formation optical system in which a light beam is optically converged at an information medium such as an optical medium or a magneto-optical medium like an optical disk or an optical card, an optical head apparatus in which information is written in the information medium with the image-formation optical system and the written information is read out or erased, and an optical information apparatus in which a positional relation between the information medium and the optical head apparatus is precisely adjusted. Also, the present invention relates to an information writing and reading method for optically writing information in the information medium with the image-formation optical system and reading the information with the optical head apparatus.

2. Description of the Related Art

An optical memory technique has been put to practical use to manufacture an optical disk in which a pit pattern indicating information is formed. The optical disk is utilized as a high density and large capacity of information medium. For example, the optical disk is utilized for a digital audio disk, a video disk, a document file disk, and a data file disk. To store information in the optical disk and to read the information from the optical disk, a light beam radiated from a light source is minutely narrowed in diameter in an image-formation optical system, and the light beam minutely narrowed is radiated to the optical disk through the image-formation optical system. Therefore, the light beam is required to be reliably controlled in the image-formation optical system with high accuracy.

The image-formation optical system is utilized for an optical head apparatus in which a detector is additionally provided to detect intensity of the light beam reflected by the optical disk. Also, the optical head apparatus is utilized for an optical information apparatus in which a control section is additionally provided to adjust a positional relation between the optical disk and the optical head apparatus. Fundamental functions of the optical information apparatus are classified into converging performance for minutely narrowing a light beam to form a diffraction-limited microspot of the light beam radiated on an optical disk, focus control in a focus servo system, tracking control in a tracking serve system, and detection of pit signals (or information signals) obtained by radiating the light beam on a pit pattern of the optical disk.

The image-formation optical system is composed of a light source for radiating a light beam, and a group of lenses including an objective lens for converging the light beam at an optical disk and directing the light beam reflected by the optical disk to an information signal detecting system. The information signal detecting system is provided with optical elements for dividing the light beam into signal light beams indicating various signals such as an information signal, a photo detector for detecting intensities of the signal light beams, and an actuating unit for moving the objective lens of the image-formation optical system. The optical head apparatus is composed of the image-formation optical system and the information signal detecting system. The optical information apparatus is composed of the optical head apparatus and a control section for controlling the position of the objective lens of the image-formation optical system under control of a focus servo system and a tracking servo system. A gas laser is initially utilized as the light source, and a semiconductor laser has been recently utilized as the light source because the semiconductor laser can be manufactured at a moderate cost in a small size.

However, in cases where the semiconductor laser is utilized as the light source, a driving current supplied to the semiconductor laser changes each time a writing operation and a reading operation are exchanged for each other. Therefore, a refractive index of semiconductor laser material changes in dependence on the driving current. As a result, a wavelength of the light beam changes each time the writing operation and the reading operation are exchanged for each other. In this case, a refractive index of the objective lens for the light beam changes in dependence on the change of the wavelength of the light beam. Therefore, a light spot of the light beam converged at the optical disk is in a defocus condition until focus control in a focus servo system follows up the change of the wavelength of the light beam. That is, there is a drawback that the exchange of the reading and writing operations cannot be quickly performed.

To reduce the change of the refractive index of the objective lens, a first trial in which the objective lens is made of material having a low wavelength-dispersion characteristic has been proposed. However, because the material having the low wavelength-dispersion characteristic has a low refractive index, a curvature of the objective lens is required to be enlarged. Therefore, it is difficult to make the objective lens having a large numerical aperture (NA) and the low wavelength-dispersion characteristic. Also, a second trial in which a combination lens formed by combining a plurality of lenses having various wavelength-dispersion characteristics is utilized for the image-formation optical system has been proposed.

2.1. First Previously Proposed Art

FIG. 1 is a constitutional view of a conventional optical head apparatus.

As shown in FIG. 1, a light beam B1 linearly polarized is radiated from a semiconductor laser 11 in a conventional optical head apparatus 10. The light beam B1 is collimated by a combination lens 12, and the cross section of the light beam B1 is reshaped in circular shape by a wedge-like prism 13. Thereafter, the light beam B1 transmits through a beam splitter 14 and is converged by an objective lens 15 at an information medium in an outgoing light path. In this case, the position of the objective lens 15 is adjusted with an actuating unit 17 to focus the objective lens 15 on the information medium 16. Therefore, a light spot Ls is formed on the information medium 16. The light beam B1 reflected by the information medium 16 transmits through the objective lens 15 in an incoming light path, and a major part of the light beam B1 is reflected by the beam splitter 14. Thereafter, the light beam B1 is converged by a collimator lens 18, and a wavefront of the light beam B1 is changed in a servo signal detecting unit 19 to obtain a focus error signal and a tracking error signal. Thereafter, the intensity of the light beam B1 is detected in a photo detector 20. Therefore, the focus and tracking error signals and an information signal is obtained by calculating the intensity of the light beam B1 detected, and the actuating unit 17 is moved in dependence on the focus and tracking error signals to adjust the position of the objective lens In this case, to quickly move the objective lens 15, the objective lens 15 is required to be lightweight. Therefore, a combined lens composed of a plurality of refracting lenses cannot be utilized for the objective lens 15. As a result, chromatic aberration of the objective lens 15 necessarily exists because of the change of the refractive index in the objective lens 15 for the beam light B1 of which the wavelength changes each time the reading and writing operations are exchanged for each other. To reduce adverse influence of the chromatic aberration of the objective lens 15, chromatic aberration of the combination lens 12 is excessively corrected to cancel out the chromatic aberration of the objective lens 15. That is, a focal length of the objective lens 15 is lengthened as the wavelength of the light beam B1 becomes longer because of the increase of the driving current supplied to the semiconductor laser 11. In contrast, a focal length of the combination lens 12 is shortened as the wavelength of the light beam B1 becomes longer.

2.2. Second Previously Proposed Art

Next, an example of achromatization performed in a single lens is shown in FIG. 2. The lens utilized for the achromatization has not been applied to any optical head apparatus.

FIG. 2 is a cross-sectional view of a conventional achromatic lens in which a hologram lens is combined.

As shown in FIG. 2, a conventional achromatic lens 21 consists of a diffraction grating type of hologram lens 22 and a refracting lens 23. Where a symbol $f_{Ho}$ denotes a focal length of the hologram lens 22 for a light beam $L_B$ having a wavelength $\lambda_o$, and a symbol $f_{H1}$ denotes a focal length of the hologram lens 22 for another light beam $L_B$ having a wavelength $\lambda_1$, an equation (1) is satisfied.

$$f_{H1}=f_{Ho} \times \lambda_o/\lambda_1 \qquad (1)$$

The focal length $f_H$ of the hologram lens 22 is shortened as the wavelength $\lambda$ of the light beam $L_B$ becomes longer. Also, where a symbol $n(\lambda)$ denotes a refractive index of the refracting lens 23 for the light beam $L_B$ having the wavelength $\lambda$ and a symbol $f_D(\lambda)$ denotes a focal length of the refracting lens 23 for the light beam $L_B$ having the wavelength $\lambda$, an equation (2) is satisfied.

$$f_D(\lambda_1)=f_D(\lambda_o) \times (n(\lambda_o)-1)/(n(\lambda_1)-1) \qquad (2)$$

The focal length $f_D(\lambda)$ of the refracting lens 23 is lengthened as the wavelength $\lambda$ of the light beam $L_B$ becomes longer. That is, the dependence of the focal length $f_D(\lambda)$ on the wavelength $\lambda$ of the refracting lens 23 is opposite to that in the hologram lens 22. Therefore, a condition that a combination lens of the lenses 22, 23 functions as the achromatic lens 21 is formulated by an equation (3).

$$\begin{aligned} 1/f_{Ho} + 1/f_D(\lambda_o) &= 1/f_{H1} + 1/f_D(\lambda_1) \qquad (3) \\ &= 1/(f_{Ho} \times \lambda_o/\lambda_1) + \\ &\quad (n(\lambda_1)-1)/\{f_D(\lambda_o) \times \\ &\quad (n(\lambda_o)-1)\} \end{aligned}$$

Accordingly, because the dependence of the focal length $f_D(\lambda)$ on the wavelength $\lambda$ of the refracting lens 23 is opposite to that in the hologram lens 22, the achromatic lens 21 can be formed by the combination of the lenses 22, 23. Therefore, curvature of the achromatic lens 21 can be small. Also, because the hologram lens 22 is a plane type of element, the lightweight achromatic lens 21 can be made in large scale manufacture. The conventional achromatic lens has been proposed in a first literature (D. Faklis and M. Morris, Photonics Spectra (1991), November p.205 & December p.131), a second literature (M. A. Gan et al., S.P.I.E. (1991), Vol.1507, p.116), and a third literature (P. Twardowski and P. Meirueis, S.P.I.E. (1991), Vol.1507, p.55).

Also, as is described in the first literature, the hologram lens 22 is manufactured according to a manufacturing method shown in FIGS. 3A to 3F.

FIGS. 3A to 3F are respectively a cross-sectional view showing a manufacturing method of the hologram lens 22.

As shown in FIG. 3A, a hologram substrate 24 is coated with a resist 25, and the resist 25 is covered with a first patterned photomask 26. Thereafter, the resist 25 is exposed to ultraviolet radiation to transfer a first pattern to the resist 25. After the photomask 26 is taken off, the resist 25 exposed is developed to pattern the resist 25 with the first pattern as shown in FIG. 3B. After development, the hologram substrate 24 exposed is etched with an etchant at a depth H1 in a first etching process, and the resist 25 is stripped as shown in FIG. 3C.

Thereafter, the hologram substrate 24 etched is again coated with a resist 27, and the resist 27 is covered with a second patterned photo mask 28 as shown in FIG. 3D. Thereafter, the resist 27 is exposed to ultraviolet radiation to transfer a second pattern to the resist 27. After the photomask 28 is taken off, the resist 27 exposed is developed to pattern the resist 27 with the second pattern as shown in FIG. 3E. After development, the hologram substrate 24 exposed is again etched with an etchant at a depth H2 in a second etching process, and the resist 27 is stripped as shown in FIG. 3F.

Accordingly, the hologram lens 22 of which the surface is blazed and formed in echelon shape as a multilevel hologram can be manufactured by repeating a lithography process and an etching process.

Also, another manufacturing method of a hologram lens has been proposed in a fourth literature (K. Goto et al., J.J.A.P. (1987), Vol. 26, Supplement 26-4).

FIG. 4 shows an original form of a hologram substrate patterned with a cutting tool.

As shown in FIG. 4, a hologram lens 29 can be manufactured with a cutting tool 30 of a super precision CNC lathe.

In the fourth literature, a combination lens of a spherical lens and the hologram lens 29 is applied to an optical head apparatus to reduce aberration such as off-axis aberration according to an aspherical lens effect. Therefore, chromatic aberration of the combination lens is not corrected. That is, when the wavelength of a light beam radiated from a semiconductor laser fluctuates, the focal point of the combination lens is moved.

2.3. Third Previously Proposed Art

A prior art laid open to public inspection under Provisional Publication No. 155514/91 (H3-155514) and under Provisional Publication No. 155515/91 (H3-155515) is cited as a third previously proposed art.

FIG. 5 is a cross-sectional view of a conventional optically converging system consisting of an objective lens and a chromatic aberration correction element.

As shown in FIG. 5, a conventional optically converging system 31 consists of an objective lens 32 focused on an information medium 33 and an chromatic aberration correction lens 34 arranged at a light source side. The objective lens 32 is allowed to be exchanged for a hologram lens. The chromatic aberration correction lens 34 is a combination lens of a positive lens 35 (or a convex lens) and a negative lens 36 (or a concave lens). Though the chromatic aberration correction lens 34 has no lens function, chromatic aberration of the objective lens 32 is corrected with the chromatic aberration correction lens 34 because a wavelength-dispersion coefficient of the positive lens 35 differs from that of the negative lens 36.

Therefore, the chromatic aberration correction lens 34 functions in the same manner as the combination lens 12.

2.4. Problems to be Solved by the Invention

In cases where a light beam radiated from a semiconductor laser is converged by a lens to form an image, the lens generally has astigmatic aberration because an astigmatic difference necessarily occurs in an active layer of the semiconductor laser. The reason that the astigmatic difference occurs in the active layer is described with reference to FIGS. 6 and 7.

As shown in FIG. 6, where a longitudinal direction of an active layer 37 in an end facet 11a of the semiconductor laser 11 is defined as a horizontal direction, an outgoing radiation point $Pr_H$ in the horizontal direction is positioned within the active layer 37 by a length $\delta$. In contrast, another outgoing radiation point Pry in a vertical direction perpendicular to the horizontal direction is positioned at the end facet 11a. Therefore, the astigmatic difference occurs in the active layer 37 so that the astigmatic aberration occurs in the conventional optical head apparatus 10.

To remove the astigmatic aberration, a collimator lens 38 composed of the combination lens 12 and the wedge-like prism 13 in the first previously proposed art is moved in the outgoing light path direction. In detail, because an elliptic cross section of the light beam B1 is corrected in circular shape with the wedge-like prism 13, a focal length $f_{cv}$ of the collimator lens 38 in the vertical direction differ from another focal length $f_{CH}$ of the collimator lens 38 in the horizontal direction, as shown in FIGS. 7(a), 7(b). A light beam path in the vertical direction from the outgoing radiation point $Pr_v$ to the information medium 16 is shown in FIG. 7(a), and a light beam path in the horizontal direction from the outgoing radiation point $Pr_H$ to the information medium 16 is shown in FIG. 7(b). Symbols shown in FIGS. 7(a), 7(b) denote as follows.

$f_o$: a focal length of the objective lens 15;

$f_c$: a focal length of the combined lens 12, and a focal length of first collimator lens 44 in embodiments according to the present invention;

$f_{cv}$: an equivalent focal length of the collimator lens 38 in the vertical direction ($=f_c$);

$f_{CH}$: an equivalent focal length of the collimator lens 38 in the horizontal direction ($=f_c \times \gamma$);

$\gamma$: an elliptic beam correction coefficient in the wedge-like prism 13, $\gamma>1$;

$\delta$: the astigmatic difference;

$\delta_v$: a difference between a focal point Fc of the collimator lens 38 and an objective point (or the outgoing radiation point $Pr_v$) in the vertical direction; $\delta_H$: a difference between the focal point Fc of the collimator lens 38 and an objective point (or the outgoing radiation point $Pr_H$) in the horizontal direction;

$\epsilon_v$: a difference between a focal point Fo of the objective lens 15 and an image point $Pi_v$ in the vertical direction; and $\epsilon_H$: a difference between the focal point Fo of the objective lens 15 and an image point $Pi_H$ in the horizontal direction.

To set a relationship $\epsilon_v = \epsilon_H$, the collimator lens 38 is moved towards the objective lens 15 to increase the difference $\delta_v$ ($\delta_v > 0$) so that the focal point Fc positioned at the end facet 11a of the semiconductor laser 11 is also moved towards the objective lens 15. Therefore, the image points $Pi_v$, $Pi_H$ in the horizontal and vertical directions are moved towards the objective lens 15.

Because a relation in longitudinal magnification is satisfied, equations (4), (5) are obtained.

$$\epsilon_v = \delta_v \times (f_o/f_{cv})^2 \qquad (4)$$
$$= \delta_v \times (f_o/f_c)^2$$
$$\epsilon_H = \delta_H \times (f_o/f_{CH})^2 \qquad (5)$$
$$\delta_H \times (1/\gamma^2) \times (f_o/f_c)^2$$

To remove the astigmatic aberration occurring in an image which reflects on the information medium 16, the relationship $\epsilon_v = \epsilon_H$ is required. Therefore, an equation (6) is obtained by use of the equations (4), (5).

$$\delta_v \times \gamma^2 = \delta_H \qquad (6)$$

Therefore, in cases where the collimator lens 38 is moved towards the objective lens 15 on condition that the equation (6) is satisfied, the astigmatic aberration is removed.

However, even though the position of the collimator lens 38 is adjusted to satisfy the equation (6) in the reading operation in which intensity of the light beam B1 is low because the driving current supplied to the semiconductor laser 11 is low, the astigmatic aberration occurs in an image reflecting on the Information medium 16 in the writing operation in which intensity of the light beam B1 is high because the driving current supplied to the semiconductor laser 11 is high.

In detail, as the intensity of the light beam B1 is increased, the wavelength of the light beam B1 is lengthened. Therefore, the focal length $f_c$ of the collimator lens 38 is shortened because the chromatic aberration of the combination lens 12 is excessively corrected to cancel out the chromatic aberration of the objective lens 15. As a result, the difference $\delta_v$ is increased to maintain a summed value $\delta_v + f_c$ of the difference $\delta_v$ and the focal length $f_c$, and the difference $\delta_H$ is increased to maintain a summed value $\delta_H + f_c$ of the difference $\delta_v$ and the focal length $f_c$. Accordingly, a ratio $\delta_H/\delta_v$ becomes smaller than a value $\gamma^2$ in the writing operation. In addition, as the intensity of the light beam B1 is increased, the astigmatic difference $\delta$ is decreased, as is well known. Therefore, the ratio $\delta_H/\delta_v$ is moreover decreased in the writing operation.

Accordingly, in cases where the reading operation and the writing operation are exchanged for each other in the conventional optical head apparatus 10, the collimator lens 38 cannot be moved on condition that the equation (6) is satisfied in the writing operation. Also, in cases where the position of the collimator lens 38 is adjusted to satisfy the equation (6) in the writing operation, the ratio $\delta_H/\delta_v$ becomes larger than the value $\gamma^2$. Therefore, the collimator lens 38 cannot be moved to satisfy the equation (6) in the reading operation. As a result, there is a drawback that the astigmatic aberration necessarily occurs on the information medium 16.

Next, various drawbacks in the conventional achromatic lens 21 of the second previously proposed art are described.

The conventional achromatic lens 21 has no chromatic aberration. However, in cases where the lens 21 is applied to an image-formed optical system or an optical head apparatus, many drawbacks occur as follows.

1. To apply the achromatic lens 21 to the optical head apparatus 10, the chromatic aberration of each of lenses utilized in the optical system is required to be corrected.

Therefore, degree of freedom in design is considerably decreased. Specifically, though the astigmatic difference δ varies in dependence on the change in the output intensity of the semiconductor laser 11, the lenses cannot be designed so as to compensate the variation of the astigmatic difference δ. Therefore, the astigmatic aberration necessarily occurs in the light spot Ls on the information medium 16, so that an information signal obtained in the apparatus 10 deteriorates.

2. To apply the achromatic lens 21 to the optical head apparatus 10, three hologram lenses 22 are required to be utilized in the collimator lenses 18, 38 and the objective lens 15 for the purpose of the correction of the chromatic aberration of the lenses 15, 18, 38. Therefore, many number of hologram lenses 22 are provided in the apparatus 10, so that the apparatus 10 cannot be manufactured at a moderate cost.

3. A diffraction efficiency of the hologram lens 22 varies in dependence on the wavelength of light transmitting through the hologram lens 22. Also, a design method for appropriately setting the diffraction efficiency in an optical head apparatus has never been proposed in the prior art. Therefore, in cases where the achromatic lens 21 is applied to the optical head apparatus, the diffraction efficiency of the hologram lens 22 becomes lowered in the reading operation. In this case, even though first-order diffraction light is mainly generated in the hologram lens 22 to obtain an information signal, other light such as zero-order diffraction light (or transmitting light), minus first-order diffraction light, and second-order diffraction light is undesirably generated in the hologram lens 22. The undesired other light becomes stray light so that the undesired other light functions as noise. Therefore, a signal-noise ratio (S/N ratio) considerably deteriorates.

Next, various drawbacks in the conventional optical system 31 of the third previously proposed art are described.

1. Because the chromatic aberration correction lens 34 is formed by combining the positive lens 35 and the negative lens 36, manufacturing costs such as material costs, production costs, combination costs including adjustment costs of the positive lens 35 and the negative lens 36, and attachment costs are required. Therefore, the conventional optical system 31 cannot be applied to an image-formation optical system or an optical head apparatus at a moderate cost.

2. Because the chromatic aberration correction lens 34 is formed by combining the positive lens 35 and the negative lens 36, the lens 34 becomes heavy and large. Therefore, in cases where the lens 34 is utilized in an image-formation optical system or an optical head apparatus, the system or the apparatus becomes heavy and large.

3. Because the chromatic aberration correction lens 34 is heavy and because the objective lens 32 is required to be slightly moved at high speed under control of a focus servo system and a tracking servo system, the lens 34 cannot be integrally formed with the objective lens 32 on condition that the objective lens 32 and the lens 34 are slightly moved at high speed. Therefore, a positional relation between the lenses 32, 34 changes when the objective lens 32 is moved. Therefore, even though the chromatic aberration of the objective lens 32 is always corrected by the chromatic aberration correction lens 34 regardless of the change in the positional relation, other aberration such as the astigmatic aberration are required to be independently corrected. In this case, degree of freedom in the design of lenses such as the objective lens 32 becomes low. As a result, aspherical lenses are required in an image-formation optical system or an optical head apparatus. Accordingly, the design and manufacturing of the system or the apparatus becomes difficult, and the system or the apparatus cannot be manufactured at a moderate cost.

4. The chromatic aberration correction lens 34 is heavy. Also, the objective lens 32 is slightly moved at high speed under control of a focus servo system and a tracking servo system. Therefore, the lens 34 cannot be integrally formed with the objective lens 32. In this case, a holding element for holding the lens 34 is required independently of another holding element for holding the objective lens 32. Accordingly, the conventional optical system 31 cannot be applied to an image-formation optical system or an optical head apparatus at a moderate cost, and the system or the apparatus becomes large.

SUMMARY OF THE INVENTION

A first object of the present invention is to provide, with due consideration to the drawbacks of such a conventional optical system and a conventional optical head apparatus, an image-formation optical system in which a light beam is converged at an information medium to read or write information from/in the information medium while preventing the movement of a focal point of an objective lens and the occurrence of astigmatic aberration even though the wavelength of light radiated from a semiconductor laser changes and the astigmatic difference changes.

A second object of the present invention is to provide an optical head apparatus in which information stored in an information medium is read while preventing the movement of a focal point of an objective lens and the occurrence of astigmatic aberration by use of the image-formation optical system.

A third object of the present invention is to provide an optical information apparatus in which the position of an objective lens is precisely adjusted by use of the optical head apparatus while the occurrence of astigmatic aberration are prevented.

A fourth object of the present invention is to provide an information reading or writing method for optically reading or writing information from/in an information medium by use of the image-formation optical system. Also, the fourth object is to provide an information reading method for optically reading information from an information medium by use of the optical head apparatus.

The first object is achieved by the provision of an image-formation optical system for converging a light beam at an information medium to read or write information from/in the information medium, comprising:

a semiconductor laser for radiating a light beam, a wavelength of the light beam being lengthened as intensity of the light beam is increased;

a first convex lens for refracting the light beam radiated from the semiconductor laser, a focal length of the first convex lens being lengthened as the wavelength of the light beam becomes longer;

a refraction type of objective lens for converting the light beam refracted by the first convex lens at the information medium to read or write information from/in the information medium, a focal length of the objective lens being lengthened as the wavelength of the light beam becomes longer; and a chromatic aberration correcting element for excessively correcting chromatic aberration of the objective lens to cancel out chromatic aberration of the first convex lens.

In the above configuration, a light beam having a wavelength is radiated from the semiconductor laser. The light beam is refracted by the first convex lens to, for example, collimate the light beam. Thereafter, the light beam transmits through the chromatic aberration correcting element and is converged at the information medium to read or write information from/in the information medium.

In this case, intensity of the light beam in a writing operation is greatly larger than intensity of the light beam in a reading operation. Therefore, a wavelength of the light beam in the writing operation becomes larger than another wavelength of the light beam in the reading information. Therefore, a focal length of the first convex lens in the writing operation is larger than another focal length of the first convex type of lens in the reading operation. Also, a focal length of the objective lens in the writing operation is larger than another focal length of the objective lens in the reading operation. Therefore, unless chromatic aberration of both the objective lens and the first convex lens is corrected by the chromatic aberration correcting element, the chromatic aberration occurs in an image reflecting on the information medium. In the present invention, the chromatic aberration of both the objective lens and the first convex lens is completely canceled out by the chromatic aberration correcting element. Accordingly, no chromatic aberration occurs in the image-formation optical system.

In addition, even though no chromatic aberration occurs, astigmatic aberration occurs in a conventional optical system because an astigmatic difference $\delta$ inevitably occurs in a semiconductor laser. To remove the astigmatic aberration in the present invention, an equation $\delta_v \times \gamma^2 = \delta_H$ is required to be satisfied. Here the symbol $\gamma$ denotes an elliptic beam correction coefficient which is constant ($\gamma > 1$) even though the wavelength of the light beam changes, the symbol $\delta_v$ denotes a difference from a focal point Fc of the first convex lens to an outgoing radiation point of the light beam in a vertical direction, and the symbol $\delta_H$ denotes a difference from the focal point Fc of the first convex lens to an outgoing radiation point in a horizontal direction. In the present invention, as the wavelength of the light beam is increased, the differences $\delta_v$, $\delta_H$ are respectively decreased because the focal length of the first convex lens is lengthened. Therefore, a ratio $\delta_H/\delta_v$ is forced to be increased. In contrast, the astigmatic difference $\delta$ is decreased as the wavelength of the light beam is increased. Therefore, the differences $\delta_v$, $\delta_H$ are respectively increased so that the ratio $\delta_H/\delta_v$ is forced to be decreased. Accordingly, the ratio $\delta_H/\delta_v$ can be set to a constant value even though the wavelength of the light beam changes. That is, the equation $\delta_v \times \gamma^2 = \delta_H$ can be always satisfied even though the reading and writing operations are exchanged for each other. As a result, the astigmatic aberration can be reliably removed in the image-formation optical system according to the present invention.

It is preferred that the chromatic aberration correcting element is a plane type of hologram lens functioning as a diffraction optical element, and the hologram lens is integrally formed with the objective lens.

In the above configuration, the hologram lens is moved with the objective lens. Therefore, it is not required to independently prevent other aberration such as a coma aberration from occurring on the information medium 42. In other words, all types of aberration can be prevented as a whole. Accordingly, degree of freedom in the design of the objective lens is increased, so that the image-formation optical system can be arbitrarily designed to prevent all types of aberration.

Also, it is preferred that the image-formation optical system additionally include a light beam reshaping element for reshaping an elliptic cross section of the light beam refracted by the first convex lens into an circular cross section, a combined focal length of both the light beam reshaping element and the first convex lens in a major axis direction of the elliptic cross section differing from a combined focal length of those in a minor axis direction of the elliptic cross section to form an image on the information medium without astigmatic aberration even though an astigmatic difference occurs in the semiconductor laser, and the light beam reshaped by the light beam reshaping element transmitting through the chromatic aberration correcting element and the objective lens.

In the above configuration, the major axis direction of the elliptic cross section agrees with the vertical direction, and the minor axis direction of the elliptic cross section agrees with the horizontal direction. Therefore, a combined focal length $f_{cv}$ in the vertical direction becomes shorter than another combined focal length $f_{cH}$ in the horizontal direction. In this case, even though the astigmatic difference $\delta$ occurs in the semiconductor laser, a difference $\epsilon_v$ between a focal point Fo of the objective lens and an image point $Pi_v$ in the vertical direction agrees with another difference $\epsilon_H$ between the focal point Fo and an image point $Pi_H$ in the horizontal direction.

Accordingly, the occurrence of the astigmatic aberration can be prevented.

Also, it is preferred that the chromatic aberration correcting element comprise a polarizing anisotropic hologram lens for diffracting the light beam which is linearly polarized in an X direction in an outgoing light path, and a quarter-wave plate for converting the light beam diffracted by the polarizing anisotropic hologram lens into a circularly-polarized-light beam in the outgoing light path and again converting the circularly-polarized-light beam of which a rotating direction is reversed on the information medium into a linearly-polarized-light beam polarized in a Y direction perpendicular to the X-direction in an incoming light path, the linearly-polarized-light beam polarized in the Y direction by the quarter-wave plate transmitting through the polarizing anisotropic hologram lens without being diffracted.

In the above configuration, because the light beam in the outgoing light path is diffracted in the polarizing anisotropic hologram lens and because the light beam in the incoming light path is not diffracted in the polarizing anisotropic hologram lens, the incoming light path differs from the outgoing light path. Therefore, even though the light beam reflected by the information medium is fed back to the semiconductor laser, the light beam does not couple to an active layer of the semiconductor laser. Accordingly, noise caused by the light beam fed back to the semiconductor laser can be prevented.

The second object is achieved by the provision of an optical head apparatus for reading information from an information medium, comprising:

a semiconductor laser for radiating a light beam, a wavelength of the light beam being lengthened as intensity of the light beam is increased;

a first convex lens for refracting the light beam radiated from the semiconductor laser, a focal length of the first convex lens being lengthened as the wavelength of the light beam becomes longer;

a refraction type of objective lens for converting the light beam refracted by the first convex lens at the information medium to read information from the information medium, a focal length of the objective lens being lengthened as the wavelength of the light beam becomes longer;

a chromatic aberration correcting element moved with the objective lens for excessively correcting chromatic aberration of the objective lens to cancel out chromatic aberration of the first convex lens;

a second convex lens for converging the light beam which is reflected by the information medium and again transmits through the objective lens and the chromatic aberration correcting element, a focal length of the second convex lens being lengthened as the wavelength of the light beam becomes longer, and chromatic aberration of the second convex lens being corrected by the chromatic aberration correcting element; and a photo detector for detecting intensity of the light beam converged by the second convex lens to obtain an information signal indicating the information stored in the information medium.

In the above configuration, the chromatic aberration of the objective lens and the first and second convex lenses is corrected by the chromatic aberration correcting element. Also, an image is formed on the information medium without the the chromatic aberration or the astigmatic aberration because the image-formation optical system described above is utilized in the optical head apparatus.

Accordingly, the information stored in the information medium can be read with high accuracy.

It is preferred that the chromatic aberration correcting element be a plane type of hologram lens functioning as a diffraction optical element and a plurality of relieves be concentrically arranged on a surface of the hologram lens to form a hologram pattern, a height H of the reliefs being determined to maximize a diffraction efficiency of the hologram lens in a reading operation in which a wavelength $\lambda_R$ of the light beam is shorter than that in a writing operation.

In the above configuration, because the height H of the relieves is determined to maximize a diffraction efficiency of the hologram lens in a reading operation, the occurrence of unnecessary light such as zero-order diffracted light (or transmitting light) can be prevented to the utmost. Accordingly, in cases where the height H of the reliefs is, for example, set to satisfy an equation $H=\lambda_R/(n(\lambda_R)-1)$ where the symbol $n(\lambda_R)$ denotes a refractive index of the hologram lens, noise including the information signal can be reduced.

Also, it is preferred that the optical head apparatus additionally include:

a servo signal generating optical element partitioned into a plurality of diffracted light generation regions for converting the light beam converged by the second convex lens into one or more servo signal light beams, the servo signal light beams being detected by the photo detector to generate one or more servo signals; and an actuating unit for moving both the objective lens and the chromatic aberration correcting element under control of the servo signals generated in the photo detector.

In the above configuration, servo signals such as a focus error signal and a tracking error signal are generated in the photo detector because the light beam is divided and converted in the diffracted light generation regions into the servo signal light beams. Therefore, the position of both the objective lens and the chromatic aberration correcting element moved together by the actuating unit can be adjusted under control of the servo signals to decrease focus and tracking errors.

The third object is achieved by the provision of an optical information apparatus for reading or writing information from/in an information medium, comprising:

an information medium driving mechanism for rotating the information medium;

an external electric source for supplying driving power to the information driving mechanism;

an optical head apparatus comprising a semiconductor laser for radiating a light beam, a wavelength of the light beam being lengthened as intensity of the light beam is increased, a first convex lens for refracting the light beam radiated from the semiconductor laser, a focal length of the convex type of lens being lengthened as the wavelength of the light beam becomes longer, a refraction type of objective lens for converting the light beam refracted by the first convex lens at the information medium to read or write information from/in the information medium, a focal length of the objective lens being lengthened as the wavelength of the light beam becomes longer, a chromatic aberration correcting element moved with the objective lens for excessively correcting chromatic aberration of the objective lens to cancel out chromatic aberration of the first convex lens, a second convex lens for converging the light beam which is reflected by the information medium and again transmits through the objective lens and the chromatic aberration correcting element, a focal length of the second convex lens being lengthened as the wavelength of the light beam becomes longer, and chromatic aberration of the second convex lens being corrected by the chromatic aberration correcting element, a servo signal generating element for dividing the light beam converged by the second convex lens into an information signal light beam and servo signal beams such as a focus error signal light beam and a tracking error signal light beam, a photo detector for detecting intensities of the light beams obtained in the servo signal generating element to obtain an information signal indicating the information stored in the information medium and servo signals such as a focus error signal and a tracking error signal, and an actuating unit for moving both the objective lens and the chromatic aberration correcting element under control of the servo signals generated in the photo detector;

an optical head driving apparatus for roughly positioning the objective lens of the optical head apparatus on a desired pit of the information medium; and a control circuit for generating a control signal according to the servo signals obtained in the photo detector and precisely positioning the objective lens of the optical head apparatus on the desired pit of the information medium under control of the control signal.

In the above configuration, the information medium is rotated by the information medium driving mechanism, and the objective lens of the optical head apparatus is roughly positioned by the optical head driving apparatus. Thereafter, servo signals such as a focus error signal and a tracking error signal is obtained in the optical head apparatus, and a control signal is generated in the control circuit according to the servo signals. The objective lens is precisely positioned under control of the control signal.

Accordingly, because the optical head apparatus is provided in the optical information apparatus, information can be reliably read or stored from/in the information medium without the chromatic aberration or the astigmatic aberration.

The fourth object is achieved by the provision of a method for converging a light beam at an information medium to optically read or write information from/in the information medium, comprising the steps of:

collimating a light beam radiated from a semiconductor laser in a collimator lens, a wavelength of the light beam being lengthened as intensity of the light beam being increased, and a focal length of the collimator lens being lengthened as the wavelength of the light beam becomes longer;

converging the light beam collimated by the collimator lens at the information medium by use of an objective lens to read or write information from/in the information medium, a focal length of the objective lens being lengthened as the wavelength of the light beam becomes longer; and excessively correcting chromatic aberration of the objective lens by use of a hologram lens to cancel out chromatic aberration of the collimator lens, a focal length of the hologram lens being shortened as the wavelength of the light beam becomes longer, a combined focal length of the collimator and objective lenses and the hologram lens being constant even though the wavelength of the light beam changes, and the hologram lens being moved with the objective lens.

In the above steps, a light beam radiated from a semiconductor laser is collimated and converged at the information medium. In this case, the chromatic aberration of the collimator lens and the objective lens is corrected by the hologram lens. Therefore, an image can be clearly formed on the information medium without the chromatic aberration.

Also, an astigmatic difference occurs in the semiconductor laser. The astigmatic difference changes in dependence on the wavelength of the light beam. The change of the focal length of the collimator lens cancels out the change of the astigmatic difference. Therefore, the occurrence of astigmatic aberration can be prevented.

In addition, because the hologram lens is moved with the objective lens, other types of aberration are not required to be independently removed.

Also, the fourth object is achieved by the provision of a method for optically reading information from an information medium, comprising the steps of:

collimating a light beam radiated from a semiconductor laser in a collimator lens, a wavelength of the light beam being lengthened as intensity of the light beam being increased, and a focal length of the collimator lens being lengthened as the wavelength of the light beam becomes longer;

converging the light beam collimated by the collimator lens at the information medium by use of an objective lens to read information stored in the information medium, a focal length of the objective lens being lengthened as the wavelength of the light beam becomes longer;

excessively correcting chromatic aberration of the objective lens by use of a hologram lens to cancel out chromatic aberration of the collimator lens, a focal length of the hologram lens being shortened as the wavelength of the light beam becomes longer, a combined focal length of the collimator and objective lenses and the hologram lens being constant even though the wavelength of the light beam changes, and the hologram lens being moved with the objective lens;

transmitting the light beam through the objective lens and the hologram lens;

converging the light beam which is reflected by the information medium by use of a refractive lens, a focal length of the refractive lens being lengthened as the wavelength of the light beam becomes longer, and chromatic aberration of the refractive lens being corrected by the hologram lens; and detecting intensity of the light beam converged by the refractive lens to obtain an information signal indicating the information stored in the information medium.

In the above steps, a light beam radiated from a semiconductor laser is collimated and converged at the information medium to read information stored in the information medium. In this case, the chromatic aberration of the collimator lens and the objective lens is corrected by the hologram lens in an outgoing light path. Therefore, an image can be clearly formed on the information medium without the chromatic aberration. Thereafter, the light beam is reflected by the information medium and again transmits through the objective lens and the hologram lens. Thereafter, the light beam is converged at a photo detector to obtain an information signal. In this case, the chromatic aberration of the objective lens and the refractive lens is corrected by the hologram lens in an incoming light path. Therefore, the information signal can be clearly obtained.

Also, an astigmatic difference occurs in the semiconductor laser. The astigmatic difference changes in dependence on the wavelength of the light beam. The change of the focal length of the collimator lens cancels out the change of the astigmatic difference. Therefore, the occurrence of astigmatic aberration can be prevented.

In addition, because the hologram lens is moved with the objective lens, other types of aberration are not required to be independently removed.

BRIEF DESCRIPTION OF THE DRAWINGS

The objects, features and advantages of the present invention will be apparent from the following description taken in conjunction with the accompanying drawings, in which:

FIG. 10 is a constitutional view of an optical head apparatus according to a third embodiment of the present invention;

FIG. 11 shows a hologram pattern of a hologram lens according to a fourth embodiment;

FIG. 15 is a constitutional view of an optical head apparatus according to the fifth embodiment, explanatorily showing two beams of diffracted light (spherical wave) generated by the hologram lens shown in FIG. 15 and a design method of the hologram lens;

DETAIL DESCRIPTION OF THE PREFERRED EMBODIMENTS

Preferred embodiments of an image-formation optical system, an optical head apparatus, an optical information apparatus, and an information storing and reading method according to the present invention are described with reference to drawings.

Figure 8:
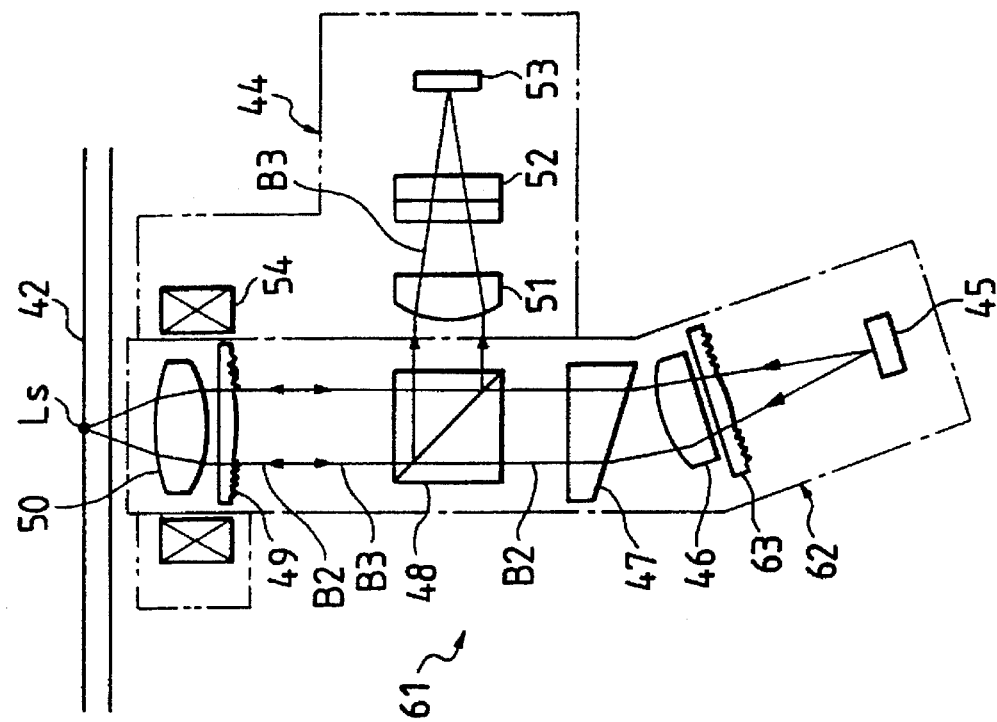
FIG. 8 is a constitutional view of an optical head apparatus according to a first embodiment of the present invention.

FIG. 8 is a constitutional view of an optical head apparatus according to a first embodiment of the present invention.

As shown in FIG. 8, an optical head apparatus 41 for storing and reading information in/from an information medium 42 such as an optical disk, comprises an image-formation optical system 43 for optically converging a light beam at the information medium 42, and an information detecting system 44 for detecting the information read by the image-formation optical system 43. The image-formation optical system 43 comprises a semiconductor laser 45 for radiating a light beam B2 of which a cross section is in elliptic shape, a first collimator lens 46 for almost collimating the light beam B2, a wedge-like prism 47 for reshaping the light beam B2, a beam splitter 48 for transmitting through the light beam B2 reshaped in an outgoing light path and splitting the light beam B2 reflected on the information medium 42 in an incoming light path, a hologram lens 49 for correcting chromatic aberration in the image-formation optical system 43 to prevent the chromatic aberration from occurring on the information medium 42, and an objective lens 50 integrally formed with the hologram lens 49 for converging the light beam B2 at a pit of the information medium 42 to form a light spot Ls on the information medium 42.

The hologram lens 49 is a phase type diffraction optical element and a plane type optical element, and a plurality of blazed reliefs are concentrically arranged on a surface of the hologram lens 49 to form a hologram pattern. Therefore, the phase of the light beam B2 is changed in the hologram lens 49 to diffract the light beam b2 in a particular direction. Also, the hologram lens 49 functions as a convex lens to refract the light beam B2. The center of the hologram pattern and the center of the objective lens 50 are respectively positioned on a central line of the outgoing light path to decrease off-axis aberration such as astigmatic aberration and coma aberration.

A focal length of the objective lens 50 is lengthened as the wavelength of the light beam B2 becomes longer. Also, a focal length $f_c$ of the first collimator lens 46 is lengthened as the wavelength of the light beam B2 becomes longer. In contrast, as the wavelength of the light beam B2 becomes longer, a focal length of the hologram lens 49 is shortened to cancel out the increase of the focal lengths of both the first collimator lens 46 and the objective lens 50. Therefore, a combined focal length of both the hologram lens 49 and the objective lens 50 is shortened as the wavelength of the light beam B2 becomes longer, and a combined focal length of the lenses 46, 49 and 50 is constant even though the wavelength of the light beam B2 changes.

In the above configuration, the light beam B2 radiated from the semiconductor laser 43 is almost collimated by the first collimator lens 46. Thereafter, the cross section of the light beam B2 having an elliptic cross section is circularly reshaped by the wedge-like prism 47. That is, an intensity distribution of the light beam B2 reshaped in an X-axis direction perpendicular to the outgoing light path becomes the same as that in a Y-axis direction perpendicular to both the outgoing light path and the X-axis direction. This reshaping is called an elliptic beam correction or a light beam reshaping. Thereafter, the light beam B2 transmits through the beam splitter 48 and is diffracted by the hologram lens 49. Thereafter, the light beam B2 is converged at the information medium 42 by the objective lens 50 to write or read information in/from the information medium 42.

In this case, the chromatic aberration of the objective lens 50 is excessively corrected by the hologram lens 49 because a combined focal length of both the hologram lens 49 and the objective lens 50 is shortened as the wavelength of the light beam B2 becomes longer. Therefore, though the focal length $f_c$ of the first collimator lens 46 is lengthened as the wavelength of the light beam B2 becomes longer, the excessive correction of the hologram lens 49 cancels out the chromatic aberration of the first collimator lens 46.

Accordingly, the chromatic aberration in the image-formation optical system 43 can be canceled out because the hologram lens 49 is provided in the system 43. Also, even though the wavelength of the light beam B2 radiated from the semiconductor laser 43 changes, a combined focal length of the lenses 46, 49, and 50 becomes constant. Therefore, a small light spot Ls of the light beam B2 can be always formed on the information medium 42 without occurring the chromatic aberration.

Also, because only the hologram lens 49 is additionally provided in the system 43 and because the hologram lens 49 made of the plane type optical element is light in weight, the image-formation optical system 43 can be manufactured in lightweight and small size.

In addition, in cases where the wavelength of the light beam B2 becomes longer because of the increase of output intensity of the light beam B2 radiated from the semiconductor laser 43, the focal length $f_c$ of the first collimator lens 46 is lengthened. In this case, the difference $\delta_v$ is decreased to maintain a summed value $\delta_v + f_c$ of the difference $\delta_v$ and the focal length $f_c$, and the difference $\delta_H$ is decreased to maintain a summed value $\delta_H + f_c$ of the difference $\delta_H$ and the focal length $f_c$. Therefore, the ratio $\delta_H/\delta_v$ is forced to be increased according to an external effect. In contrast, as the output intensity of the light beam B2 is increased, the astigmatic difference $\delta$ is decreased, as is well known. Therefore, the ratio $\delta_H/\delta_v$ is forced to be decreased according to an internal effect. As a result, the increase of the ratio $\delta_H/\delta_v$ according to the external effect is canceled out by the decrease of the ratio $\delta_H/\delta_v$ according to the internal effect.

Accordingly, even though the wavelength of the light beam B2 radiated from the semiconductor laser 43 changes, the equation (6) can be stably satisfied. In other words, no astigmatic aberration occurs on the information medium 42.

Also, because the hologram lens 49 functions as the convex lens, the curvature of the objective lens 50 can be small. Also, lens material having a comparatively large dispersion value $\Delta n/(n-1)$ (for example, Abbe number $(n-1)/\Delta n$ is less than 60) can be utilized for the objective lens 50. Here the symbol n is a refractive index of the lens material, and the symbol $\Delta n$ is a change rate of the refractive index with respect to a wavelength of light. In this case, because a refractive index of the objective lens 50 can be comparatively large, the curvature of the objective lens 50 can be moreover small. Accordingly, the objective lens can be easily produced, and the image-formation optical system 43 can be manufactured at a moderate cost.

The information detecting system 44 comprises a second collimator lens 51 for converging light beam B3 which is generated by reflecting the light beam B2 by the information medium 42 and is split by the beam splitter 48, a wavefront converting element 52 for converting wavefront of the light beam B3 to divide the light beam B3 into focus light indicating a focus error signal, tracking light indicating a tracking error signal, and information light indicating an information signal, a photo detector 53 for detecting the intensity of the focus light, the intensity of the tracking light, and the intensity of the information light to obtain the information signal and servo signals such as the focus error signal and the tracking error signal, and an actuating unit 54 for slightly moving the hologram lens 49 and the objective lens 50 integrally formed with each other at high speed according to the focus error signal and the tracking error signal obtained in the photo detector 53.

A focal length of the second collimator lens 51 is lengthened as the wavelength of the light beam B3 (or the wavelength of the light beam B2) becomes longer. The wavefront converting element 52 functions as a servo signal light generating element in which servo signal light such as the focus light and the tracking light is generated.

In the above configuration, after the light beam B2 is converged at the information medium 42, a light beam B3 is reflected by the information medium 42. Thereafter, the light beam B3 is returned through the same incoming light path as the outgoing light path and is split by the beam splitter 48. Thereafter, the light beam B3 is converged by the second collimator lens 51, and the wavefront of the light beam B3 is converted by the wavefront converting element 52. Therefore, the light beam B3 is divided into focus light, tracking light, and information light. Thereafter, the intensity of the light beam B3 divided is detected by the photo detector 53. In the photo detector 53, the intensity of the focus light, the intensity of the tracking light, and the intensity of the information light are independently detected so that a focus error signal, a tracking error signal, and an information signal are obtained. Thereafter, the hologram lens 49 and the objective lens 50 integrally formed with each other are slightly moved at high speed by the actuating unit 54 according to the focus error signal and the tracking error signal. Therefore, the information signal can be obtained with high accuracy.

In this case, because the chromatic aberration of the objective lens 50 is excessively corrected by the hologram lens 49, the excessive correction of the hologram lens 49 cancels out the chromatic aberration of the second collimator lens 51. Therefore, the occurrence of an offset in the focus error signal can be prevented.

The weight of the hologram lens 49 becomes light because the hologram lens 49 is the plane type optical element. For example, the hologram lens 49 is less than several tens mg in weight. Also, because the hologram lens 49 functions as the convex lens, the function as the convex lens required of the objective lens 50 is reduced. Therefore, the objective lens 50 can be light in weight. Accordingly, even though the hologram lens 49 is integrally formed with the objective lens 50, the hologram lens 49 and the objective lens 50 can be smoothly moved at high speed by the actuating unit 54.

Also, because the hologram lens 49 is integrally formed with the objective lens 50, the optical head apparatus 41 can be manufactured at a moderate cost in a lightweight and small size.

Also, because the hologram lens 49 can be integrally formed with the objective lens 50, it is not required to independently prevent other types of aberration such as the astigmatic aberration and a coma aberration from occurring on the information medium 42. In other words, all types of aberration of both the hologram lens 49 and the objective lens 50 can be prevented as a whole. Accordingly, degree of freedom in the design of the objective lens 50 is increased, so that the optical head apparatus 41 can be arbitrarily designed to prevent all types of aberration.

Also, because the hologram lens 49 can be integrally formed with the objective lens 50, a holding element for holding the hologram lens 49 and a holding element for holding the objective lens 40 can be in common. Accordingly, the optical head apparatus 41 can be manufactured at a moderate cost in a lightweight and small size.

As is described above, the variation of the focal length and the occurrence of the astigmatic aberration are prevented in the image-formation optical system 43. The reason is because the hologram lens 49 is arranged between the wedge-like prism 47 and the objective lens 50 to correct the chromatic aberration.

Next, a second embodiment according to the present invention is described with reference to FIG. 9.

Figure 9:
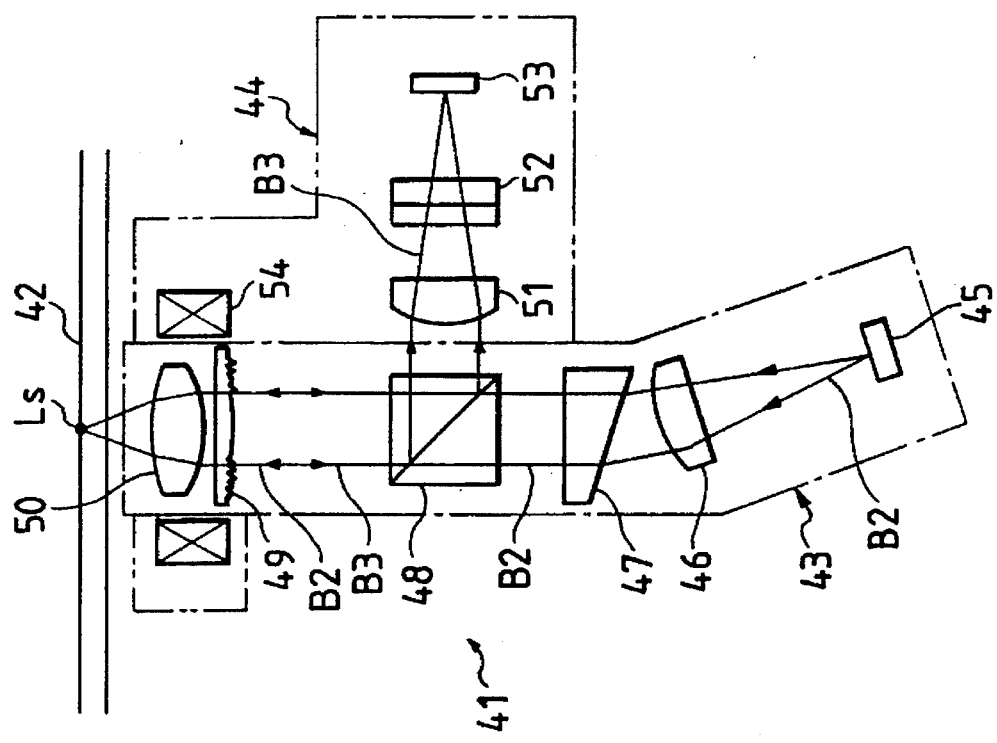
FIG. 9 is a constitutional view of an optical head apparatus according to a second embodiment of the present invention.

FIG. 9 is a constitutional view of an optical head apparatus according to a second embodiment of the present invention.

As shown in FIG. 9, an optical head apparatus 61 for storing and reading information in/from the information medium 42, comprises an image-formation optical system 62 for optically converging a light beam at the information medium 42, and the information detecting system 44.

The image-formation optical system 62 comprises the semiconductor laser 45, the first collimator lens 46, a second hologram lens 63 integrally formed with the first collimator lens 46 for auxiliarily correcting the chromatic aberration in the image-formation optical system 62, the wedge-like prism 47, the beam splitter 48, the hologram lens 49, and the objective lens 50.

The second hologram lens 63 is a phase type diffraction optical element and a plane type optical element, and a plurality of reliefs are concentrically arranged on a surface of the second hologram lens 63 to form a hologram pattern. Therefore, the second hologram lens 63 functions as a convex lens to refract the light beam B2. The center of the hologram pattern and the center of the first collimator lens 46 are respectively positioned on a central line of the outgoing light path to decrease off-axis aberration such as astigmatic aberration and coma aberration.

In the above configuration, there is a possibility that the chromatic aberration of the lenses 46, 50 is not sufficiently removed by use of the hologram lens 49 while satisfying the equation (5) because appropriate lens material of the collimator lens 46 is not found out. However, even though the chromatic aberration of the lenses 46, 50 cannot be sufficiently removed by use of the hologram lens 49 while satisfying the equation (5) to prevent the astigmatic aberration from occurring on the information medium 42, the chromatic aberration of the lenses 46, 50 can be sufficiently removed by use of the second hologram lens 63 while satisfying the equation (5). Therefore, in cases where there is no lens material of the first collimator lens 46 having a particular dispersion value which is required to remove the chromatic aberration of the lenses 46, 50 while satisfying the equation (5), the second hologram lens 63 auxiliarily functions to correct the chromatic aberration of the lenses 46, 50 in the image-formation optical system 62.

Accordingly, because the dispersion value of the first collimator lens 46 is not limited, wavelength-dispersion characteristics in the image-formation optical system can be arbitrarily designed. Also, the chromatic aberration of the lenses 46, 50 can be completely removed, and the occurrence of the astigmatic aberration on the information medium 42 can be completely prevented. Also, the lenses 46, 50 can be formed by utilizing a cheap lens material.

Next, a third embodiment according to the present invention is described with reference to FIG. 10. FIG. 10 is a constitutional view of an optical head apparatus according to a third embodiment of the present invention.

As shown in FIG. 10, an optical head apparatus 71 for storing and reading information in/from the information medium 42, comprises the image-formation optical system 43, and an information detecting system 72 for detecting the information read by the image-formation optical system 43.

The information detecting system 72 comprises the second collimator lens 51, a third hologram lens 73 integrally formed with the second collimator lens 51 for auxiliarily correcting the chromatic aberration in the information detecting system 72, the photo detector 53, and the actuating unit 54.

The third hologram lens 73 is a phase type diffraction optical element and a plane type optical element, and a plurality of reliefs are concentrically arranged on a surface of the second hologram lens 73 to form a hologram pattern. Therefore, the third hologram lens 73 functions as a convex lens to refract the light beam B3. The center of the hologram pattern and the center of the second collimator lens 51 are respectively positioned on a central line of the incoming light path to decrease off-axis aberration such as astigmatic aberration and coma aberration. In addition, the third hologram lens 73 functions in the same manner as the wavefront converting element 52.

In the above configuration, even though the chromatic aberration of the lenses 50, 51 cannot be sufficiently removed in the incoming light path by use of the hologram lens 49 while satisfying the equation (5) to prevent the astigmatic aberration from occurring on the information medium 42, the chromatic aberration of the lenses 50, 51 can be sufficiently removed by use of the third hologram lens 73 while satisfying the equation (5). Therefore, in cases where there is no lens material of the second collimator lens 51 having a particular dispersion value which is required to remove the chromatic aberration of the lenses 50, 51 while satisfying the equation (5), the third hologram lens 78 auxiliarily functions to correct the chromatic aberration of the lenses 50, 51 in the optical head apparatus 71.

Accordingly, because the dispersion value of the second collimator lens S1 is not limited, wavelength-dispersion characteristics in the optical head apparatus 71 can be arbitrarily designed. Also, the chromatic aberration of the lenses 50, 51 can be completely removed, and the occurrence of the astigmatic aberration on the photo detector 58 can be completely prevented. Also, the lenses 50, 51 can be formed by utilizing a cheap lens material.

Figure 12:
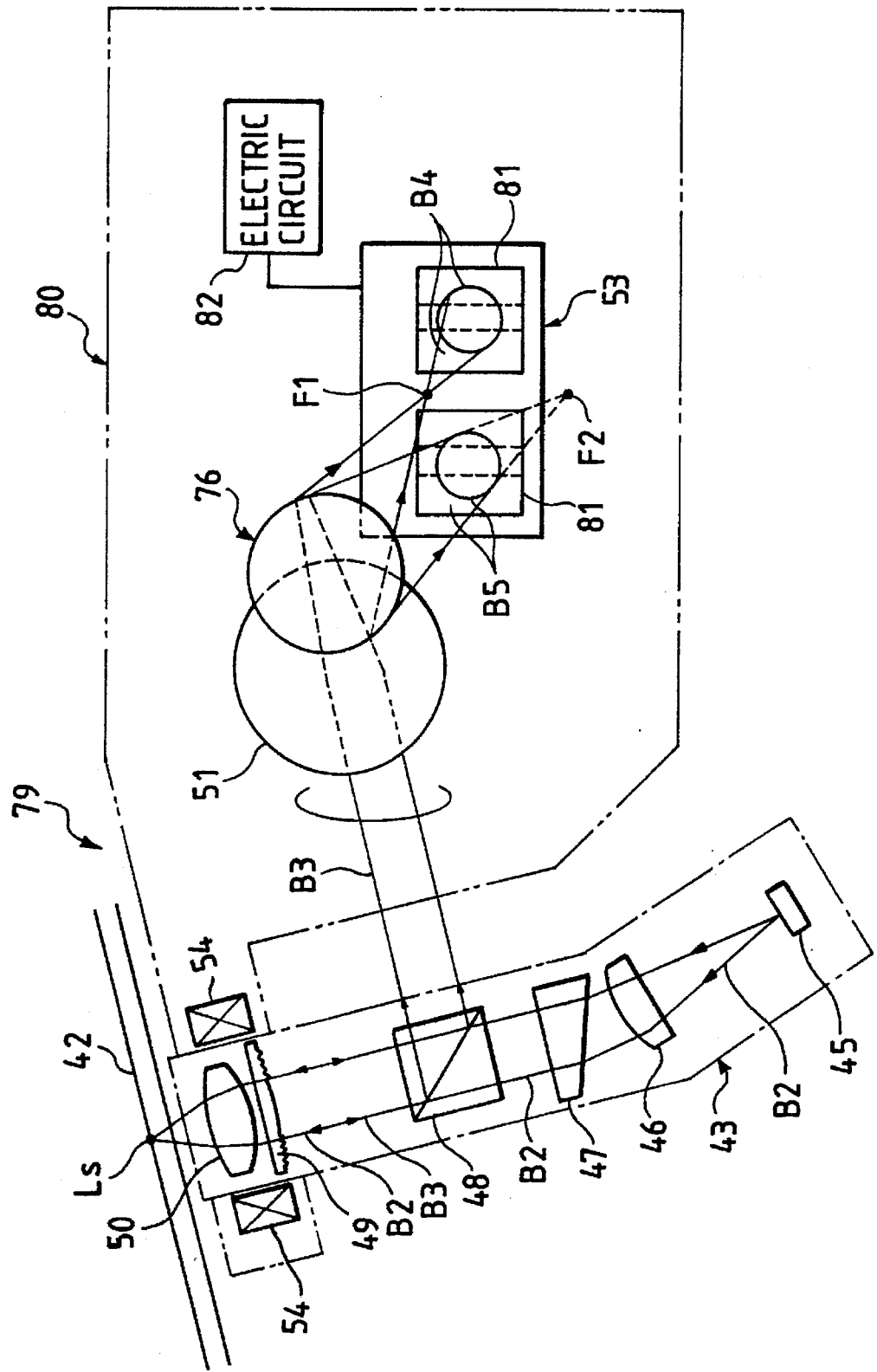
FIG. 12 is a constitutional view of an optical head apparatus according to the fourth embodiment of the present invention, explanatorily showing two types of beams of diffracted light (spherical wave) generated by the hologram lens shown in FIG. 11 and a design method of the hologram lens.

Next, an information reading method for optically reading information stored in the information medium 42 is described according to a fourth embodiment with reference to FIGS. 11 to 13.

In the fourth embodiment, a spot size detection method is utilized to detect a focus error signal. The method is proposed in Japanese Patent Application No. 185722 of 1990. In short, in cases where the method is adopted, an allowable assembly error in an optical head apparatus can be remarkably enlarged, and the servo signal such as a focus error signal can be stably obtained to adjust the position of the objective lens 50 even though the wavelength of the light beam B2 varies.

FIG. 11 shows a hologram pattern of a plane type of hologram lens 76 according to the fourth embodiment. As shown in FIG. 11, the hologram lens 76 is partitioned into a plurality of first diffraction regions 77 and a plurality of second diffraction regions 78 alternately arranged in a Y-direction. The first and second diffraction regions 77, 78 are provided to generate two beams of diffracted light utilized for the detection of a focus error. A first hologram pattern is formed on the first diffraction regions 77, and a second hologram pattern is formed on the second diffraction regions 78. The first and second hologram patterns of the first and second diffraction regions 77, 78 are formed by interference fringes which are produced by actually interfering two light beams according to a two-beam interferometric process. Or, the hologram patterns are formed by interference fringes which are produced according to a computer generated hologram method.

FIG. 12 is a constitutional view of an optical head apparatus according to the fourth embodiment of the present invention, explanatorily showing two types of beams of diffracted light (spherical wave) generated by the hologram lens 76 and a design method of the hologram lens 76.

As shown in FIG. 12, an optical head apparatus 79 for storing and reading information in/from the information medium 42, comprises the image-formation optical system 43, and an information detecting system 80 for detecting the information read by the image-formation optical system 43. The information detecting system 80 comprises the second collimator lens 51, the hologram lens 76 integrally formed with the second collimator lens 51 for converting a spherical wave of the light beam B3 into a plurality of spherical waves having various curvatures, the photo detector 53, and the actuating unit 54.

In the above configuration, a spherical wave of the light beam B3 is radiated to the first diffraction regions 77 and the second diffraction regions 78 of the hologram lens 76. Therefore, the light beam B3 diffracted in the regions 77 is changed to a first spherical wave of first-order diffracted light B4, and the light beam B3 diffracted in the regions 78 is changed to a second spherical wave of first-order diffracted light B5. A first curvature of the first spherical wave B4 differs from a second curvature of the second spherical wave B5. That is, the first-order diffracted light B4 has a first focal point F1 in the front of the photo detector 53, and the first-order diffracted light B5 has a second focal point F2 in the rear of the photo detector 53.

The photo detector 53 comprises a six-division photo detector 81 in which six detecting sections S10, S20, S30, S40, S50, and S60 are provided. The intensity of the first-order diffracted light B4 is detected by each of the detecting sections S10, S20, and S30 of the photo detector 81 and is changed to electric current signals SE1, SE2, and SE3 in an electric circuit 82. Also, the intensity of the first-order diffracted light B5 is detected by each of the detecting sections S40, S50, and S60 of the photo detector 81 and is changed to electric current signals SE4, SE5, and SE6 in the electric circuit 82.

Figure 13A:
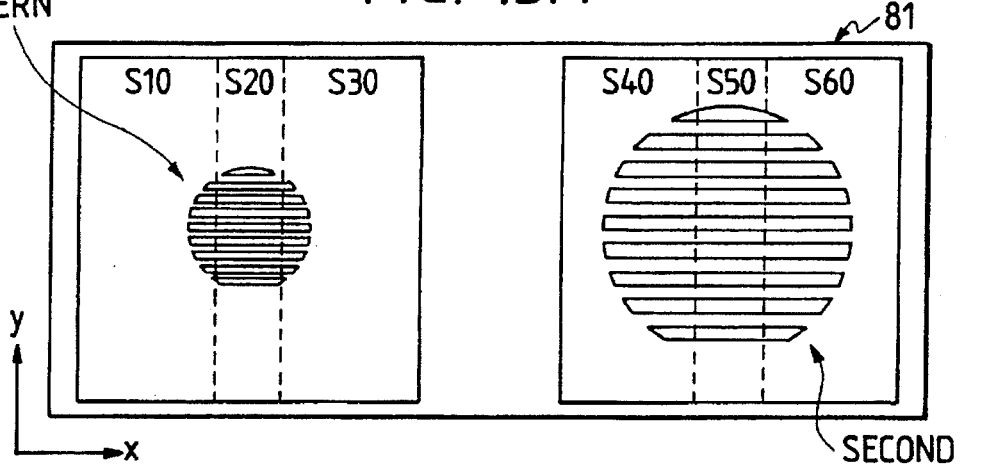
FIGS. 13A and 13C respectively show two far field patterns of spherical waves radiated to a six-division photo detector of a photo detector shown in FIG. 11 on condition that an objective lens is defocused on an information medium.
Figure 13B:
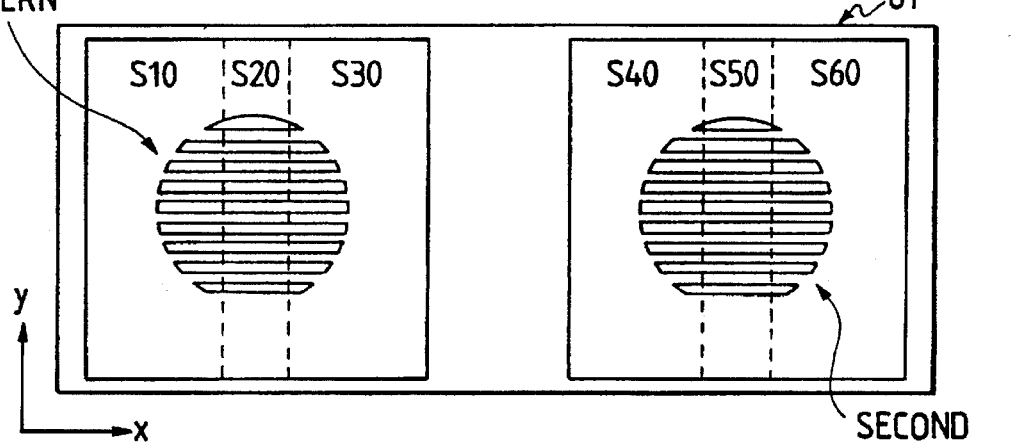
FIG. 13B shows two far field patterns of spherical waves radiated to the six-division photo detector of the photo detector shown in FIG. 11 on condition that the objective lens is just focused on the information medium.
Figure 13C:
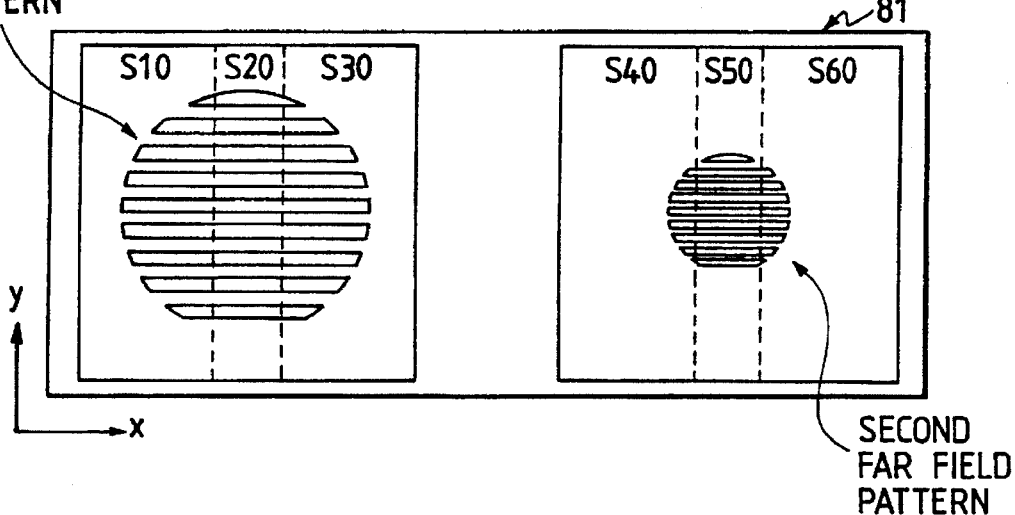

FIGS. 13A and 13C respectively show two far field patterns of spherical waves radiated to a six-division photo detector of the photo detector 53 on condition that the objective lens 50 is defocused on the information medium 42. FIG. 13B shows two far field patterns of spherical waves radiated to a six-division photo detector of the photo detector 53 on condition that the objective lens 50 is just focused on the information medium 42.

As shown in FIGS. 13A to 13C, a first far field pattern of the first spherical wave B4 reflecting on the detecting sections S10, S20, and S30 of the photo detector 81 is formed in the same manner as an inverted image of the first diffraction regions 77. Also, a second far field pattern of the second spherical wave B5 reflecting on the detecting sections S40, S50, and S60 of the photo detector 81 is formed in the same manner as an erecting image of the second diffraction regions 78. In cases where the light beam B2 is converged at the information medium 42 on condition that the objective lens 50 is defocused on the information medium 42, the first far field pattern shown at the left side of FIGS. 13A or 13C is formed on the photo detector 81, and the second far field pattern shown at the right side of FIGS. 13A or 13C is formed on the photo detector 81. In contrast, in cases where the light beam B2 is converged at the information medium 42 on condition that the objective lens 50 is just focused on the information medium 42, the first far field pattern shown at the left side of FIG. 13B is formed on the photo detector 81, and the second far field pattern shown at the right side of FIG. 13B is formed on the photo detector 81.

The intensity of the first spherical wave B4 is detected in the detecting sections S10, S20, and S30 of the photo detector 53 and is changed to electric current signals SE10, SE20, SE30 in the electric circuit 82. Also, the intensity of the second spherical wave B5 is detected in the detecting sections S40, S50, and S60 of the photo detector 53 and is changed to electric current signals SE40, SE50, SE60 in the electric circuit 82. Thereafter, a focus error signal $S_{fe}$ is obtained in the electric circuit 82 according to an equation (7).

$$S_{fe}=(SE10+SE30-SE20)-(SE40+SE60-SE50) \quad (7)$$

Thereafter, the position of the objective lens 50 is adjusted by slightly moving the objective lens 50 in a direction of the outgoing light path at high speed so as to minimize the absolute value of the focus error signal $S_{fe}$.

In this case, the first far field pattern of the first spherical wave B4 is divided into many pieces because the first hologram pattern formed on the first diffraction region 77 is divided into many pieces, and the second far field pattern is divided into many pieces because the second hologram pattern formed on the second diffraction region 78 is divided into many pieces. However, the division of each of the far field patterns does not influence on the focus error signal $S_{fe}$.

Also, because the first focal point F1 of the diffracted light B4 is positioned in the front of the photo detector 53 and because the second focal point F2 of the diffracted light B5 is positioned in the rear of the photo detector 53, both terms SE10+SE30−SE20 and SE40+SE60−SE50 in the equation (7) are inversely decreased or increased. Accordingly, even though two far field patterns of the first and second spherical waves B4, B5 reflect on the photo detector 81 as shown in FIGS. 13A or 13C, the focus error signal $S_{fe}$ can be easily approached zero, and two far field patterns of the first and second spherical waves B4, B5 shown in FIG. 18B can be obtained.

In the spot size detection method, the curvatures of the spherical waves B4, B5 differ from each other to detect the focus error signal $S_{fe}$. However, two beams of diffracted light B4, B5 radiated to the photo detector 81 is not limited to the spherical waves to detect the focus error signal $S_{fe}$ according to the spot size detection method. That is, because the change of the far field patterns in an X-direction is detected by the photo detector 81 according to the spot size detection method, it is required that a one-dimensional focal point of the diffracted light B4 in the X-direction (focal line in a Y-direction) is positioned in the front of the photo detector 81 and a one-dimensional focal point of the diffracted light B5 in the X-direction (focal line in the Y-direction) is positioned in the rear of the photo detector 81. Therefore, it is applicable that diffracted light including astigmatic aberration be radiated to the photo detector 81.

An information signal $S_{in}$ is obtained in the electric circuit 82 by adding all of the electric current signals according to an equation (8).

$$S_{in}=SE10+SE20+SE30+SE40+SE50+SE60 \quad (8)$$

Because the information medium 42 is rotated at high speed, a patterned pit radiated by the small light spot Ls of the light beam B2 is rapidly changed one after another, so that the intensity of the information signal $S_{in}$ is changed. Therefore, the information stored in the information medium 42 can be reproduced by the information signal $S_{in}$.

Next, the reason that the hologram lens 76 is partitioned into many first diffraction regions 77 and many second diffraction regions 78 is described.

When the light beam B2 is reflected by the information medium 42, the light beam B2 is diffracted by a track pit formed on the information medium 42 to form a diffraction pattern in the light beam B3. Therefore, the intensity distribution of the light beam B3 radiated on the hologram lens 76 changes in dependence on the positional relation between the light spot Ls of the light beam B2 and the track pit. For example, in cases where an extending direction of the diffraction regions 77, 78 (or X-direction in FIG. 12) is the same as that of the track pit, the intensity of the light beam B3 radiated to the upper half diffraction regions 77, 78 (positioned in +Y direction) of the hologram lens 76 is increased (or decreased). In contrast, the intensity of the light beam B3 radiated to the lower half diffraction regions 77, 78 (positioned in -Y direction) of the hologram lens 76 is decreased (or increased). Therefore, in cases where asymmetry of the first diffraction regions 77 and asymmetry of the second diffraction regions 78 are large in the Y direction, an offset of the focus error signal $S_{fe}$ occurs when the focus error signal $S_{fe}$ is produced according to the spot size detection method. In other words, even though the objective lens 50 is moved according to the focus error signal $S_{fe}$ to focus on the information medium 42, the value of the focus error signal $S_{fe}$ does not become zero.

To solve the above drawback, a large number of diffraction regions 77, 78 are alternately arranged on the hologram lens 76 to lessen both the asymmetry of the first diffraction regions 77 and the asymmetry of the second diffraction regions 78 in the Y direction. For example, it is preferred that the number of the diffraction regions 77, 78 be in a range from several to several tens regions. Therefore, the occurrence of the offset in the focus error signal $S_{fe}$ can be prevented in the fourth embodiment of the present invention.

Accordingly, a stable focus servo characteristic can be obtained by partitioning the hologram lens 76 into many diffraction fields 77, 78.

Also, because the hologram lens 76 additionally functions as a convex lens, a wavefront changing element, and a light beam dividing element, the hologram lens 76 can function as a servo signal generating optical element. Therefore, the number of constitutional elements in the optical head apparatus 71 can be decreased. As a result, a lightweight optical head apparatus can be reliably manufactured at a moderate cost according to simplified manufacturing processes.

Figure 14:
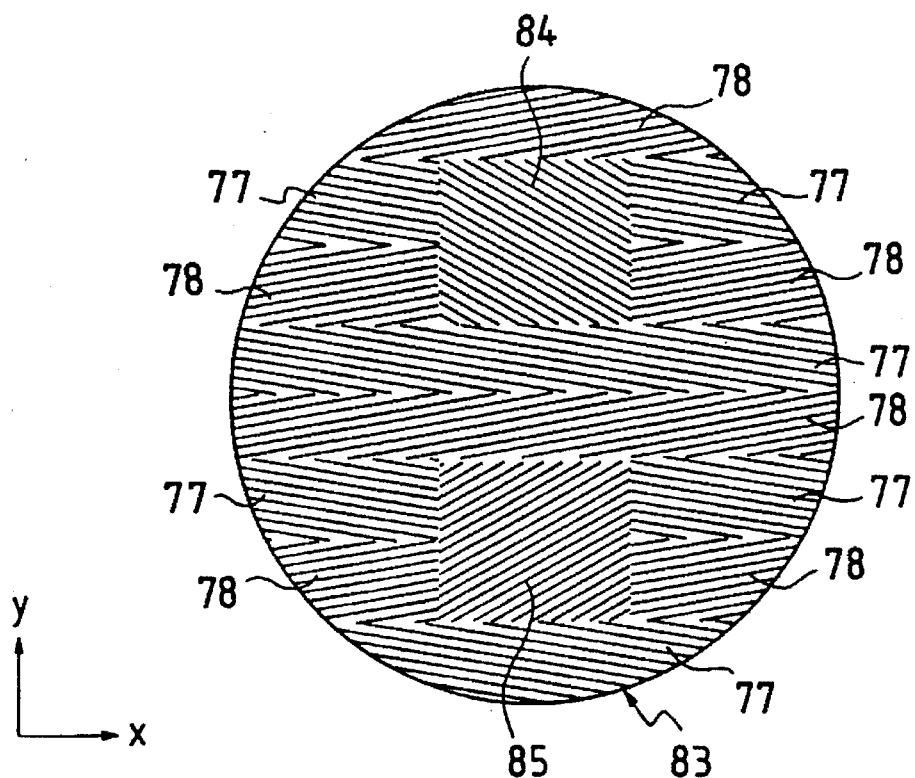
FIG. 14 shows a hologram pattern of a hologram lens according to a fifth embodiment.

Next, another information reading method for optically reading information stored in the information medium 42 with the optical head apparatus 71 is described according to a fifth embodiment with reference to FIGS. 14, 15.

FIG. 14 shows a hologram pattern of a hologram lens 83 according to the fifth embodiment. As shown in FIG. 14, the hologram lens 83 is partitioned into the first diffraction regions 77, the second diffraction regions 78, a third diffraction region 84, and a fourth diffraction region 85. The third and fourth diffraction regions 84, 85 are provided to generate two beams of diffracted light utilized for the detection of a tracking error.

FIG. 15 is a constitutional view of an optical head apparatus according to the fifth embodiment, explanatorily showing two beams of diffracted light (spherical wave) generated by the hologram lens 83 and a design method of the hologram lens 83.

As shown in FIG. 15, an optical head apparatus 86 for storing and reading information in/from the information medium 42, comprises the image-formation optical system 43, and an information detecting system 87 for detecting the information read by the image-formation optical system 43. The information detecting system 87 comprises the second collimator lens 51, the hologram lens 83 integrally formed with the second collimator lens 51 for converting a spherical wave of the light beam B3 into a plurality of spherical waves having various curvatures, the photo detector 53, and the actuating unit 54.

In the above configuration, a spherical wave of the light beam B3 is radiated to the diffraction regions 77, 78, 84, and 85 of the hologram lens 83. Therefore, the light beam B3 diffracted in the third diffraction region 84 is changed to a third spherical wave of first-order diffracted light B6, and the light beam B3 diffracted in the fourth region 85 is changed to a fourth spherical wave of first-order diffracted light B7. Also, the first spherical wave of first-order diffracted light B4 and the second spherical wave of first-order diffracted light B5 are generated by the hologram lens 83. The first-order diffracted light B6 has a third focal point F3, and the first-order diffracted light B7 has a fourth focal point F4.

The photo detector 53 comprises the six-division photo detector 81, a tracking error photo detector 88 in which two detecting sections S70 and S80 are provided. The intensity of the first-order diffracted light B6 is detected in the detecting section S70 of the photo detector 88 and is changed to an electric current signal SE70 in the electric circuit 82. Also, the intensity of the first-order diffracted light B7 is detected in the detecting section S70 of the photo detector 88 and is changed to an electric current signal SE80 in the electric circuit 82. Thereafter, a tracking error signal $S_{te}$ is calculated in the electric circuit 82 according to an equation (9).

$$S_{te}=SE70-SE80 \qquad (9)$$

Therefore, the asymmetry of the intensity distribution of the light beam B3 radiated on the hologram lens 83, which changes in dependence on the positional relation between the light spot Ls of the light beam B2 and the track pit, is indicated by the tracking error signal $S_{te}$.

Thereafter, the objective lens 50 is moved in a radial direction so as to reduce a tracking error indicated by the tracking error signal $S_{te}$. The radial direction is defined as a direction perpendicular to both the outgoing light path and the track pit. Therefore, the light spot Ls of the light beam B2 on the information medium 42 can be formed in the middle of the track pit, so that the tracking error becomes zero.

Also, two beams of diffracted light B4, B5 are detected in the photo detector 81, and the focus error signal $S_{fe}$ and the information signal $S_{in}$ are obtained in the same manner as in the fourth embodiment. Therefore, the objective lens 50 is focused on the information medium 42.

Accordingly, focus and tracking servo characteristics can be stably obtained by partitioning the hologram lens 83 into many diffraction fields 77, 78, 84, and 85.

Also, because the hologram lens 83 additionally functions as a convex lens, a wavefront changing element, and a light beam dividing element, the hologram lens 83 can function as a servo signal generating optical element. Therefore, the number of constitutional elements in the optical head apparatus 86 can be decreased. As a result, a lightweight optical head apparatus can be reliably manufactured at a moderate cost according to simplified manufacturing processes.

Next, control of the diffraction efficiency of the hologram lens 49 utilized in the optical head apparatuses 41, 61, 71, 79, and 88 is described according to sixth embodiment. Here the diffraction efficiency is defined as a converting efficiency of the light beam B2 into first-order diffracted light in the hologram lens 49.

The diffraction efficiency of the hologram lens 49 changes in dependence on the wavelength λ of the light beam B2 radiated from the semiconductor laser 45. Also, the wavelength $\lambda_R$ of the light beam B2 in a reading operation differs from the wavelength $\lambda_w$ of the light beam B2 in a writing operation. That is, the wavelength $\lambda_w$ is several nm larger than the wavelength $\lambda_R$. In addition, in cases where the diffraction efficiency of the hologram lens 49 is lowered, unnecessary diffracted light such as zero-order diffracted light (or transmitting light), minus first-order diffracted light, and second-order diffracted light is generated in the hologram lens 49. Therefore, an appropriate design of the diffraction efficiency is required to efficiently store and read information in/from the information medium 42 with high accuracy.

Figure 1:
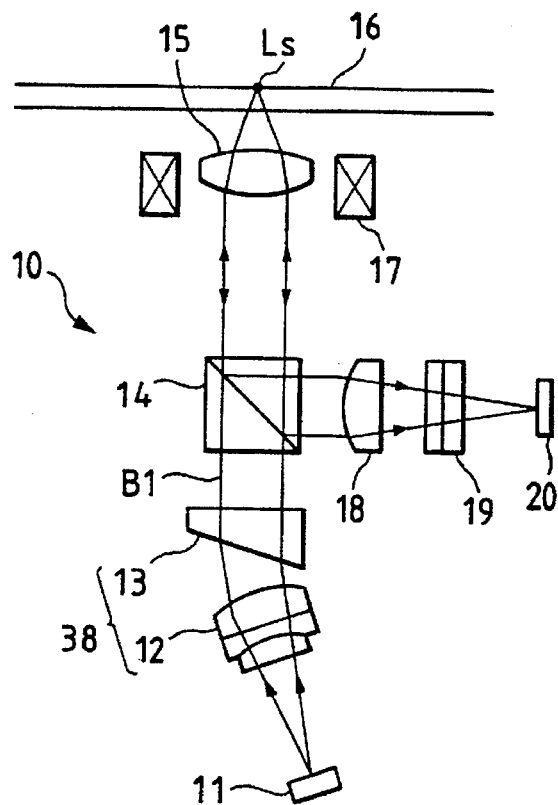
FIG. 1 is a constitutional view of a conventional optical head apparatus.
Figure 2:
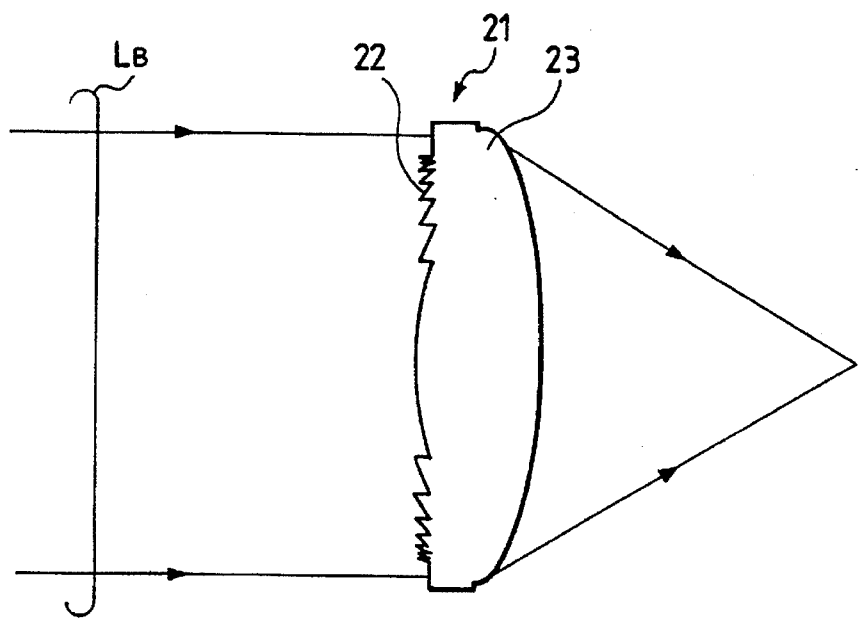
FIG. 2 is a cross-sectional view of a conventional achromatic lens in which a hologram lens is combined.
Figure 3A:
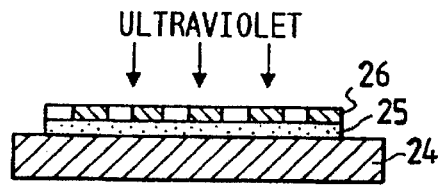
FIGS. 3A to 3F are respectively a cross-sectional view showing a manufacturing method of the hologram lens 22.
Figure 3B:
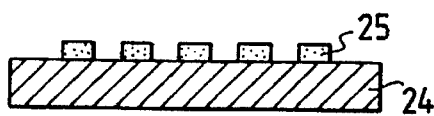
Figure 3C:
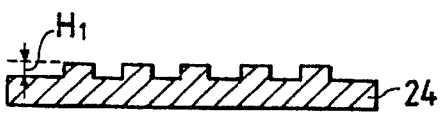
Figure 3D:
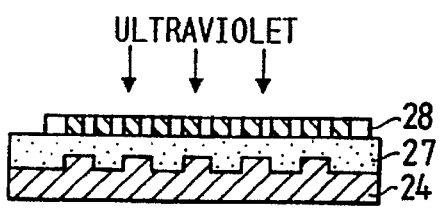
Figure 3E:
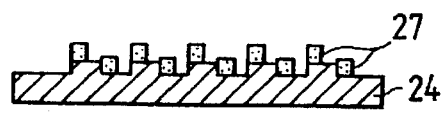
Figure 3F:
Figure 4:
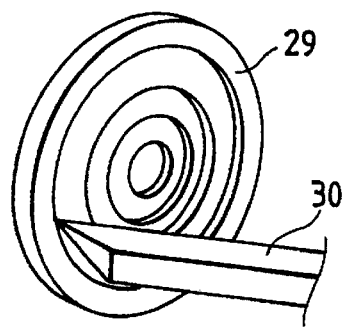
FIG. 4 shows an original form of a hologram substrate patterned by a cutting tool.
Figure 5:
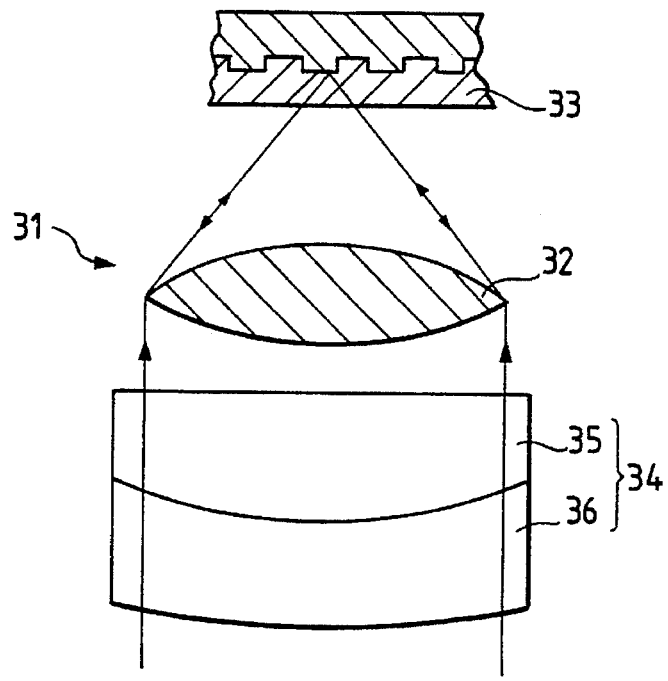
FIG. 5 is a cross-sectional view of a conventional optical system consisting of an objective lens and a chromatic aberration correction element.
Figure 6:
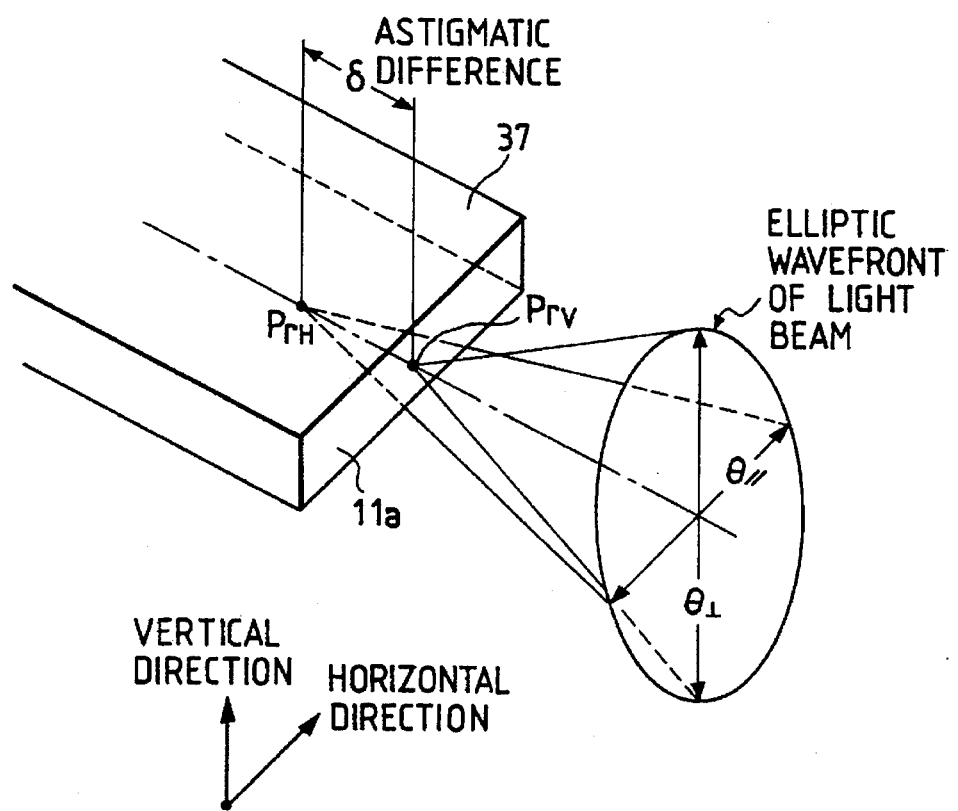
FIG. 6 explanatorily shows a light beam radiated from an outgoing radiation point positioned within an active layer in a horizontal direction.
Figure 7A:
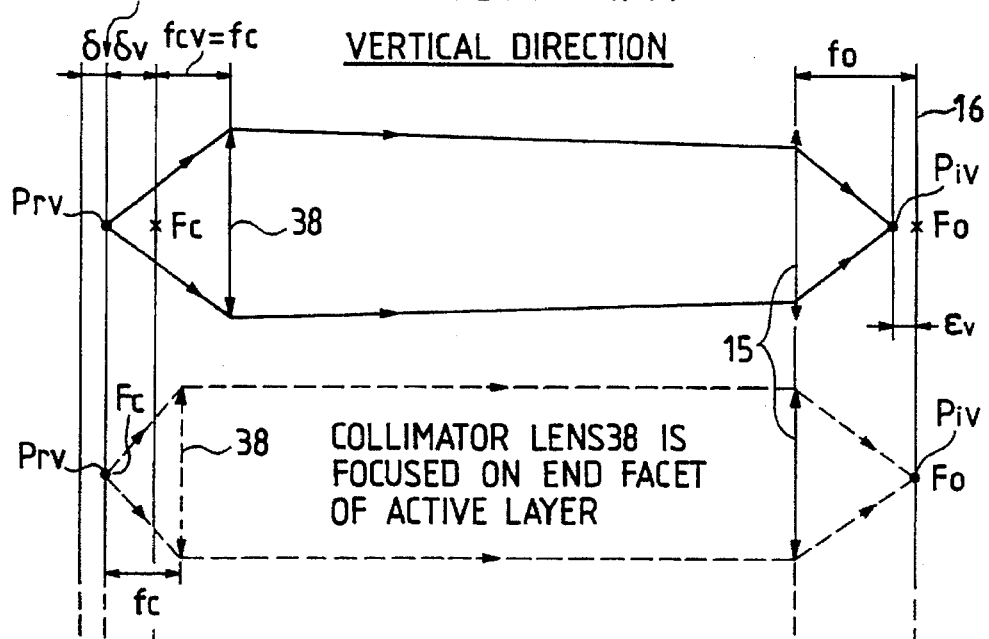
FIG. 7(a) explanatorily shows a light beam path in a vertical direction from an outgoing radiation point in a semiconductor laser to an information medium shown in FIG. 1.
Figure 7B:
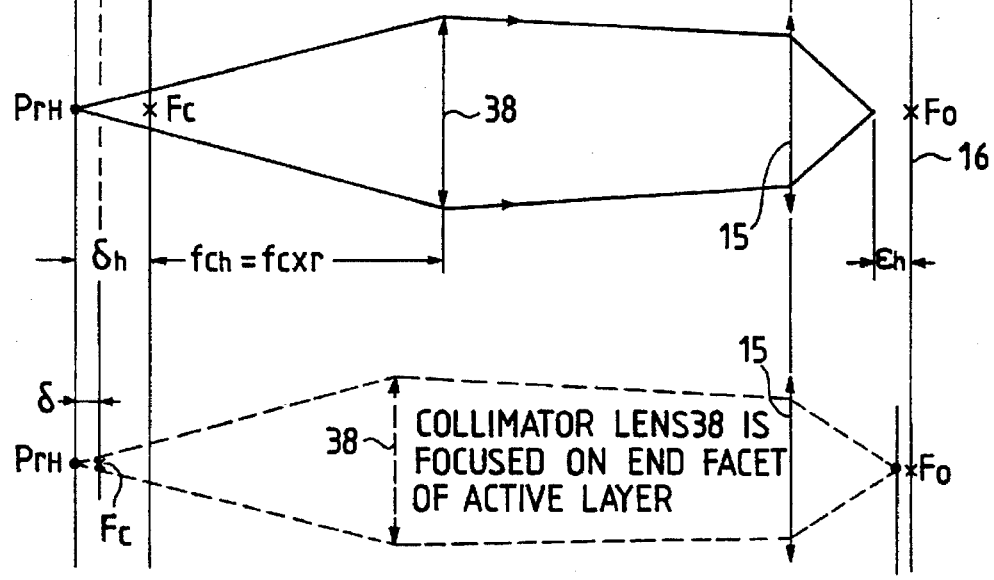
FIG. 7(b) explanatorily shows a light beam path in a horizontal direction from an outgoing radiation point in a semiconductor laser to an information medium shown in FIG. 1.
Figure 16:
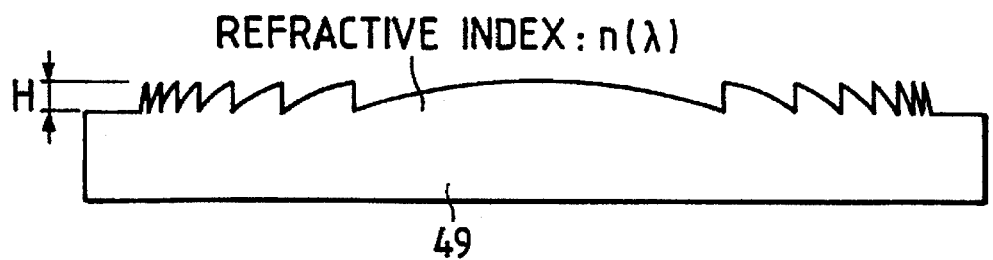
FIG. 16 is a cross sectional view of a hologram lens shown in FIGS. 8, 9, and 10.

The hologram lens 49 can be manufactured by repeating a lithography process and an etching process. Therefore, a plurality of reliefs are concentrically arranged on the surface of the hologram lens 49 in echelon shape as a multilevel hologram, as shown in FIG. 16. Or, the hologram lens 49 can be manufactured with the cutting tool 30 of a super precision CNC lathe shown in FIG. 4. In cases where the light beam B2 transmits through the hologram lens 49, phase difference occurs in the light beam B2 so that the light beam B2 is diffracted. The degree of the phase difference occurring in the light beam B2 depends on a height H of the reliefs, the wavelength λ of the light beam B2, and a refractive index n(λ) of the hologram lens 49. The diffraction efficiency relates to the degree of the phase difference. Therefore, an appropriate design in which the diffraction efficiency is maximized in both the reading and writing operations is impossible.

In the present invention, the height H of the reliefs is determined to maximize the diffraction efficiency in the reading operation. The reason is as follows. In cases where the diffraction efficiency is lowered in the reading operation, the unnecessary diffracted light is converged at the information medium 42 and is reflected to the photo detector 53. The unnecessary diffracted light functions as noise in the information signal $S_{in}$. Therefore, the decrease of the diffraction efficiency in the reading operation adversely influences on the operation in the optical head apparatuses 41, 61, 71, 79 and 86. In contrast, even though the diffraction efficiency is lowered in the writing operation to increase the unnecessary diffracted light, the intensity ratio of the unnecessary diffracted light to the first-order diffracted light (or necessary diffracted light) is no more than 1% because the difference between the wavelength $\lambda_R$ of the light beam B2 in the reading operation and the wavelength $\lambda_w$ of the light beam B2 in the writing operation is no more than several nm. Also, light having an intensity over a lower limit is required to write a piece of information in the information medium 42. Therefore, no piece of information is written in the information medium 42 by the unnecessary diffracted light in the writing operation. Accordingly, the decrease of the diffraction efficiency in the writing operation does not adversely influence on the operation in the optical head apparatuses 41, 61, 71, 79 and 86.

The height H of the reliefs is formulated by an equation (10).

$$H = \lambda_R/(n(\lambda_R)-1) \qquad (10)$$

Accordingly, the information signal $S_{in}$ does not deteriorate, and the noise included in the information signal $S_{in}$ can be lowered. Also, any piece of information can be written in the information medium 42 with high accuracy.

Next, a seventh embodiment according to the present invention is described with reference to FIGS. 17, 18.

Figure 17:
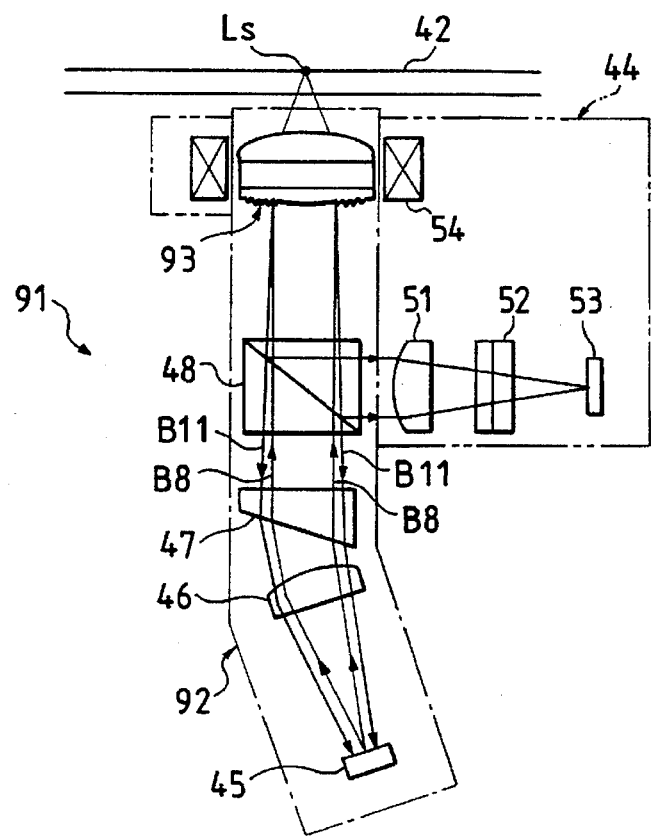
FIG. 17 is a constitutional view of an optical head apparatus according to a seventh embodiment of the present invention.

FIG. 17 is a constitutional view of an optical head apparatus according to a seventh embodiment of the present invention.

As shown in FIG. 17, an optical head apparatus 91 for storing and reading information in/from the information medium 42, comprises an image-formation optical system 92 for optically converging a light beam at the information medium 42, and the information detecting system 44. The image-formation optical system 92 comprises the semiconductor laser 45 for radiating a light beam B8 linearly polarized, the first collimator lens 46, the wedge-like prism 47, the beam splitter 48, and a combined lens 93 for converging the light beam B8 at the information medium 42.

Figure 18:
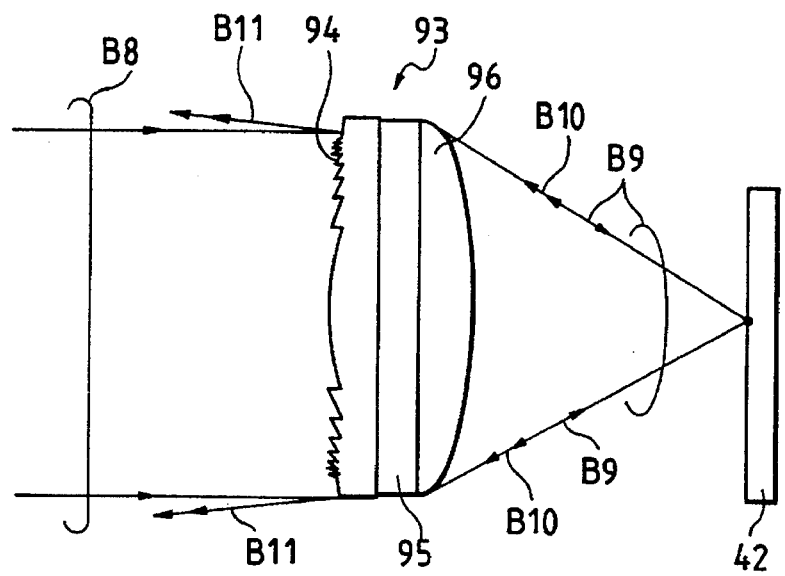
FIG. 18 is a cross-sectional view of a combined lens, explanatorily showing a light beam diffracted in an outgoing light path and not diffracted in an incoming light path.

FIG. 18 is a cross-sectional view of the combined lens 93, explanatorily showing the light beam B8 diffracted in an outgoing light path and not diffracted in an incoming light path.

As shown in FIG. 18, the combined lens 93 comprises a polarizing anisotropic hologram lens 94, a quarter-wave plate 95 of which one side is attached on a flat surface of the hologram lens 94, and an objective lens 96 attached on another side of the plate 95.

The hologram lens 94 is a plane type optical element, and a plurality of reliefs are concentrically arranged on a surface of the hologram lens 94 to form a hologram pattern. The center of the hologram pattern and the center of the objective lens 96 are respectively positioned on a central line of the outgoing light path to decrease off-axis aberration such as astigmatic aberration and coma aberration. Therefore, the polarizing anisotropic hologram lens 94 functions as a hologram lens for first light linearly polarized in an X direction. That is, the first linearly polarized light is diffracted and refracted by the hologram lens 94. In contrast, the polarizing anisotropic hologram lens 94 functions as a transparent plate for second light linearly polarized in a Y direction perpendicular to the X direction. That is, the second linearly polarized light transmits through the hologram lens 94 without being diffracted. The function of the polarizing anisotropic hologram lens 94 was laid open to public inspection under Provisional Publication No. 189504/86 (S61-189504).

A focal length of the objective lens 96 is lengthened as the wavelength of the light beam B8 becomes longer. In contrast, as the wavelength of the light beam B8 becomes longer, a focal length of the hologram lens 94 is shortened to cancel out the increase of the focal lengths of both the first collimator lens 46 and the objective lens 96. Therefore, a combined focal length of both the hologram lens 94 and the objective lens 96 is shortened as the wavelength of the light beam B8 becomes longer, and a combined focal length of the lenses 46, 94 and 96 is constant even though the wavelength of the light beam B8 changes.

In the above configuration, coherent light radiated from an active layer of the semiconductor laser 43 is linearly polarized, as is well known. Therefore, the semiconductor laser 45 is positioned to radiate light beam B8 linearly polarized in the X direction. Thereafter, the linearly polarized light beam B8 transmits through the first collimator lens 46, the wedge-like prism 47, and the beam splitter 48. Thereafter, the linearly polarized light beam B8 is diffracted and refracted by the polarizing anisotropic hologram lens 94 of the combined lens 93 in the outgoing light path. Thereafter, the linearly polarized light beam B8 is converted into light beam B9 circularly polarized (or circular polarized light B9) by the quarter-wave plate 95. Thereafter, the circular polarized light beam B9 is converged at the information medium 42 by the objective lens 96. When the light beam B9 is reflected by the information medium 42, a rotating direction of the circular polarized light B9 is reversed to produce circular polarized light beam B10. Thereafter, the circular polarized light beam B10 is converted into light beam B11 linearly polarized in the Y direction by the quarter-wave plate 95. Thereafter, because the light beam B11 is linearly polarized in the Y direction, the light beam B11 transmits through the polarizing anisotropic hologram lens 94 without being diffracted in the incoming light path. Therefore, the incoming light path differs from the outgoing light path. Thereafter, a major part of the light Beam B11 is split by the beam splitter 48 and is detected by the photo detector 53. Therefore, the information signal $S_{in}$, the tracking error signal $S_{te}$ and the focus error signal $S_{fe}$ are obtained. Also, a remaining part of the light beam B11 transmits through the beam splitter 48, the wedge-like prism 47, and the first collimator lens 46 before the light beam B11 is fed back to the semiconductor laser 45. In this case, Because the incoming light path differs from the outgoing light path, the light Beam B11 fed back is not coupled to the active layer of the semiconductor laser 45.

Accordingly, the wavelength $\lambda$ of the light beam B8 radiated from the semiconductor laser 45 is stabilized because a radiation mode change of the light beam B8 caused by light fed back to the active layer can be prevented. Therefore, noise included in the light beam B8 can be removed.

Also, the chromatic aberration of the objective lens 96 is excessively corrected by the hologram lens 94 because a combined focal length of both the hologram lens 94 and the objective lens 96 is shortened as the wavelength of the light beam B8 becomes longer. Therefore, though the focal length $f_c$ of the first collimator lens 46 is lengthened as the wavelength of the light beam B8 becomes longer, the excessive correction of the hologram lens 94 cancels out the chromatic aberration of the first collimator lens 46.

Accordingly, the chromatic aberration in the image-formation optical system 92 can be canceled out because the combined lens 93 is provided in the system 92. Also, even though the wavelength of the light beam B8 radiated from the semiconductor laser 43 changes, a combined focal length of the lenses 46, 94, and 96 becomes constant. Therefore, a small light spot Ls of the light beam B8 can be always formed on the information medium 42 without occurring the chromatic aberration.

Also, because only a combined set of the hologram lens 94 and the objective lens 96 is additionally provided in the system 92 and because the hologram lens 94 made of the plane type optical element is light in weight, the image-formation optical system 92 can be manufactured in lightweight and small size, as compared with in the third previously proposed art.

In addition, in cases where the wavelength of the light beam B8 becomes longer because of the increase of output intensity of the light beam B8 radiated from the semiconductor laser 43, the focal length $f_c$ of the first collimator lens 46 is lengthened. In this case, the difference $\delta_V$ is decreased to cancel out the increase of the focal length $f_c$, and the difference $\delta_H$ is decreased to cancel out the increase of the focal length $f_c$. Therefore, the ratio $\delta_H/\delta_V$ is forced to be increased according to an external effect. In contrast, as the output intensity of the light beam B8 is increased, the astigmatic difference $\delta$ is decreased. Therefore, the ratio $\delta_H/\delta_V$ is forced to be decreased according to an internal effect. As a result, the increase of the ratio $\delta_H/\delta_V$ according to the external effect is canceled out by the decrease of the ratio $\delta_H/\delta_V$ according to the internal effect.

Accordingly, even though the wavelength of the light beam B8 radiated from the semiconductor laser 43 changes, the equation (6) can be stably satisfied. In other words, no astigmatic aberration occurs on the information medium 42.

Also, because the hologram lens 94 functions as the convex lens, the curvature of the objective lens 96 can be small. Also, lens material having a comparatively large dispersion value $\Delta n/(n-1)$ (or Abbe number $(n-1)/\Delta n$ is less than 60) can be utilized for the objective lens 96. In this case, because a refractive index of the objective lens 96 can be comparatively large, the curvature of the objective lens 96 can be moreover small. Accordingly, the objective lens 96 can be easily produced, and the image-formation optical system 92 can be manufactured at a moderate cost.

The weight of the hologram lens 94 becomes light because the hologram lens 94 is the plane type optical element. Also, because the hologram lens 94 functions as the convex lens, the function as the convex lens required of the objective lens 96 is reduced. Therefore, the objective lens 96 can be light in weight. Accordingly, even though the hologram lens 94 is integrally formed with the objective lens 96, the hologram lens 94 and the objective lens 96 can be smoothly moved at high speed by the actuating unit 54.

Also, because the hologram lens 94 is integrally formed with the objective lens 96, the optical head apparatus 91 can be manufactured at a moderate cost in a lightweight and small size.

Also, because the hologram lens 94 is integrally formed with the objective lens 96, it is not required to independently prevent other types of aberration such as the astigmatic aberration and a coma aberration from occurring on the information medium 42. In other words, all types of aberration of both the hologram lens 94 and the objective lens 96 can be prevented as a whole. Accordingly, degree of freedom in the design of the objective lens 96 is increased, so that the optical head apparatus 91 can be arbitrarily designed to prevent all types of aberration.

Also, because the hologram lens 94 is integrally formed with the objective lens 96, a holding element for holding the hologram lens 94 and a holding element for holding the objective lens 40 can be in common. Accordingly, the optical head apparatus 91 can be manufactured at a moderate cost in a lightweight and small size.

Next, an eighth embodiment according to the present invention is described with reference to FIGS. 19, 20.

Figure 19:
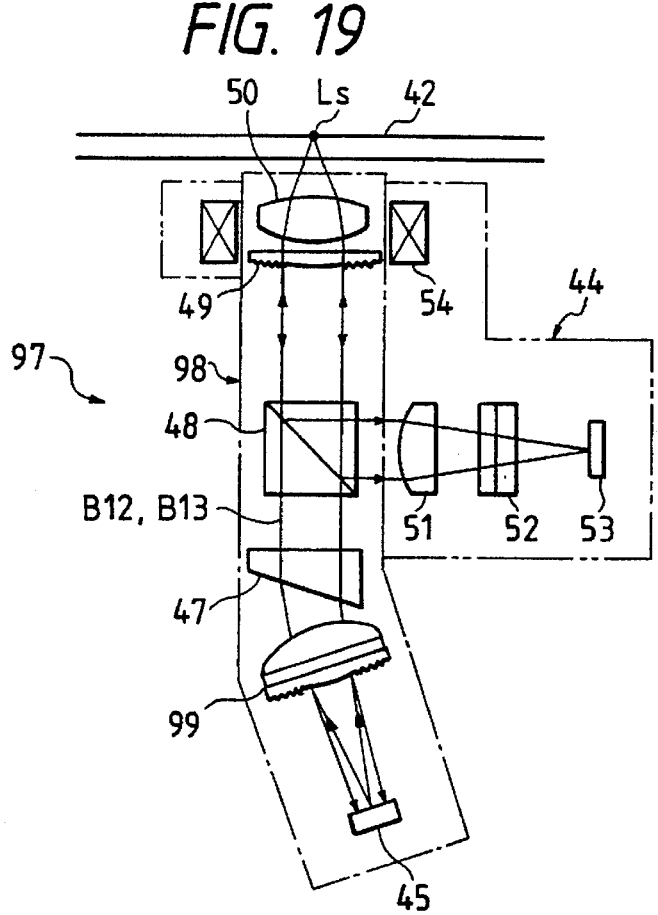
FIG. 19 is a constitutional view of an optical head apparatus in which the combined lens shown in FIG. 18 is arranged according to an eighth embodiment of the present invention.

FIG. 19 is a constitutional view of an optical head apparatus according to an eighth embodiment of the present invention.

As shown in FIG. 19, an optical head apparatus 97 for storing and reading information in/from the information medium 42, comprises an image-formation optical system 98 for optically converging a light beam at the information medium 42, and the information detecting system 44. The image-formation optical system 98 comprises the semiconductor laser 45, a combined collimator lens 99, the wedge-like prism 47, the beam splitter 48, the hologram lens 49, and the objective lens 50.

Figure 20:
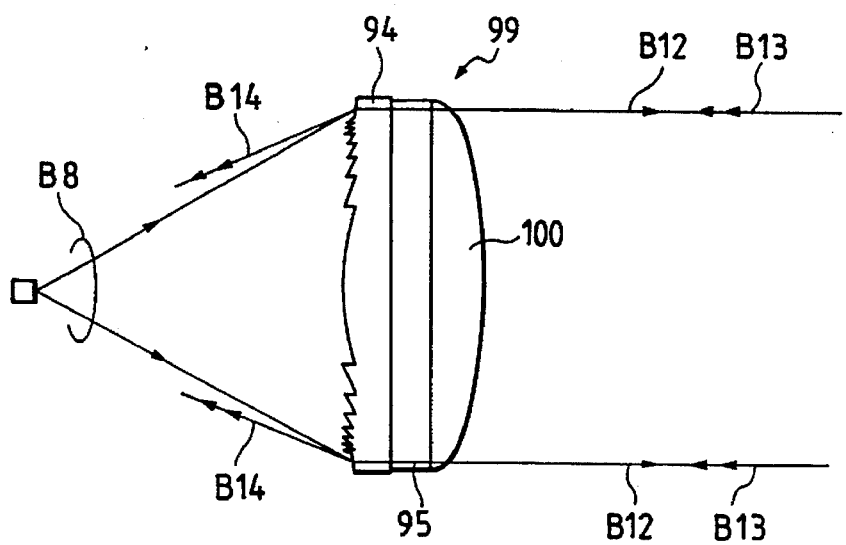
FIG. 20 is a cross-sectional view of a combined collimator lens, explanatorily showing a light beam diffracted in an outgoing light path and not diffracted in an incoming light path.

FIG. 20 is a cross-sectional view of the combined collimator lens 99, explanatorily showing the light beam B8 diffracted in an outgoing light path and not diffracted in an incoming light path.

As shown in FIG. 20, the combined collimator lens 99 comprises the polarizing anisotropic hologram lens 94, the quarter-wave plate 95, and a collimator lens 100 attached on another side of the plate 95.

A focal length of the collimator lens 100 is lengthened as the wavelength of the light beam B8 becomes longer. The chromatic aberration of the collimator lens 100 is auxiliarily corrected by the hologram lens 94. Therefore, a combined focal length of the lenses 50, 94 and 99 is constant even though the wavelength of the light beam B8 changes.

In the above configuration, the light beam B8 linearly polarized in the X direction is radiated from the semiconductor laser 48. Thereafter, the light beam B8 is diffracted and refracted by the polarizing anisotropic hologram lens 94 of the combined lens 99 in the outgoing light path. Thereafter, the light beam B8 linearly polarized is converted into light beam B12 circularly polarized (or circular polarized light B12) by the quarter-wave plate 95. Thereafter, the light beam B12 is collimated by the collimator lens 100. Thereafter, the light beam B12 transmits through the wedge-like prism 47, the beam splitter 48, the hologram lens 49 before the light beam B12 is converged at the information medium 42 by the objective lens 96. When the light beam B12 is reflected by the information medium 42, a rotating direction of the circular polarized light B12 is reversed to produce circular polarized light beam B13. Thereafter, the circular polarized light beam B13 transmits through the objective lens 50 and the hologram lens 49. Thereafter, a major part of the circular polarized light beam B13 is split by the beam splitter 48 and is detected by the photo detector 53. Therefore, the information signal $S_{in}$, the tracking error signal $S_{te}$ and the focus error signal $S_{fe}$ are obtained. Also, a remaining part of the circular polarized light beam B13 transmits through the beam splitter 48 and the wedge-like prism 47. Thereafter, the circular polarized light beam B13 is converged by the collimator lens 100 and is converted into light beam B14 linearly polarized in the Y direction perpendicular to the X direction by the quarter-wave plate 95. Thereafter, because the light beam B14 is linearly polarized in the Y direction, the light beam B14 transmits through the polarizing anisotropic hologram lens 94 without being diffracted in the incoming light path. Therefore, the incoming light path differs from the outgoing light path. Thereafter, the light beam B14 is fed back to the semiconductor laser 45. In this case, because the incoming light path differs from the outgoing light path, the light beam B14 fed back is not coupled to an active layer of the semiconductor laser 45.

Accordingly, the wavelength $\lambda$ of the light beam B8 radiated from the semiconductor laser 45 is stabilized because a radiation mode change of the light beam B8 caused by light fed back to the active layer can be prevented. Therefore, noise included in the light beam B8 can be removed.

The weight of the hologram lens 94 becomes light because the hologram lens 94 is the plane type optical element. Also, because the hologram lens 94 functions as the convex lens, the function as the convex lens required of the collimator lens 100 is reduced. Therefore, the collimator lens 96 can be light in weight. Accordingly, the hologram lens 94 can be integrally formed with the collimator lens 100. Also, because the hologram lens 94 is integrally formed with the collimator lens 100, the optical head apparatus 97 can be manufactured at a moderate cost in a lightweight and small size.

Next, an optical information apparatus for optically reading or storing information from/in the storage medium with the optical head apparatus 41, 61, 71, 79, 86, 91, or 97.

Figure 21:
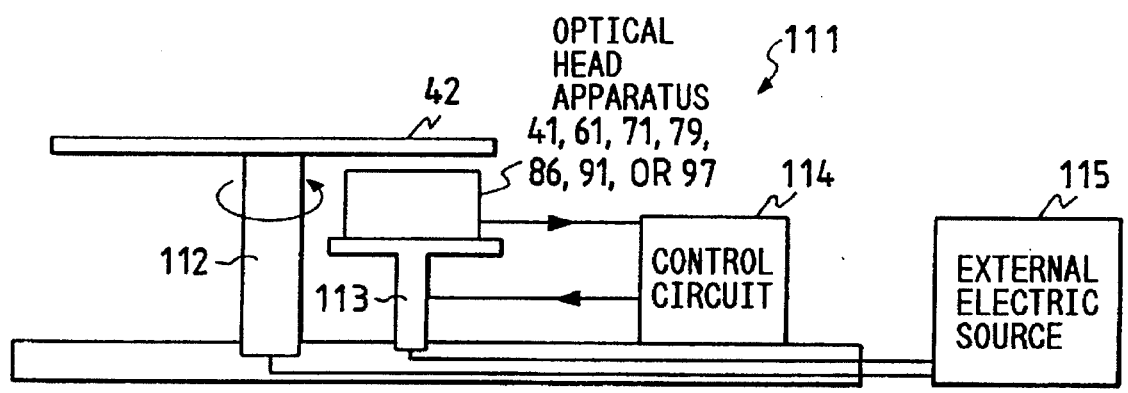
FIG. 21 is a constitutional view of an optical information apparatus according to a ninth embodiment.

FIG. 21 is a constitutional view of an optical information apparatus according to a ninth embodiment.

As shown in FIG. 21, an optical information apparatus 111 comprises the optical head apparatus 41 (or 61, 71, 79, 86, 91, or 97), an information medium driving mechanism 112 for rotating the information medium 42, an optical head driving apparatus 113 for roughly positioning the objective lens 50 (or the combined lens 93) of the apparatus 41 on a track pit of the information medium 42, a control circuit 114 for generating a servo control signal according to a focus error signal $S_{fe}$ and a tracking error signal $S_{tr}$ generated in the apparatus 41, and an external electric source 115 for supplying electric current to the information medium driving mechanism 112 and the optical head driving apparatus 113.

In the above configuration, the information medium 42 is initially rotated by the information medium driving mechanism 112. Thereafter, the apparatus 41 is moved by the optical head driving apparatus 113 so that the objective lens 50 is roughly positioned on a track pit of the information medium 42. Thereafter, a focus error signal $S_{fe}$ and a tracking error signal $S_{tr}$ are generated in the apparatus 41, and a control signal is generated in the control circuit 114 according to the focus error signal $S_{fe}$ and the tracking error signal $S_{tr}$. Thereafter, the objective lens 50 is precisely positioned on the track pit under the control of the servo control signal with the optical head driving apparatus 113. Therefore, information indicated by the track pit can be read. Also, a piece of information can be written in a track of the information medium 42 in the same manner.

Accordingly, because the optical head apparatus 41, 71, 79, 86, 91, or 97 in which an information signal $S_{in}$ having a superior S/N ratio is obtained is utilized in the optical information apparatus 111, the information stored in the information medium 42 can be stably reproduced with high accuracy.

Also, because the optical head apparatus 41, 71, 79, 86, 91, or 97 is lightweight in a small size, the optical information apparatus 111 can be lightweight in a small size, and access time can be shortened.

Also, because the chromatic aberration in the optical head apparatus 41, 71, 79, 86, 91, or 97 is suppressed, pieces of information can be stably stored in the information medium 42 in the optical information apparatus 111 with high accuracy. In addition, the information stored in the information medium 42 can be stably reproduced at high S/N ratio.

Also, because the astigmatic aberration caused by the astigmatic difference $\delta$ of the semiconductor laser 45 is suppressed in the optical head apparatus 41, 71, 79, 86, 91, or 97, pieces of information can be stably stored in the information medium 42 in the optical information apparatus 111 with high accuracy. In addition, the information stored in the information medium 42 can be stably reproduced at high S/N ratio.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. An image-formation optical system for converging a light beam at an information medium to read or write information from/in the information medium, comprising:

a semiconductor laser for radiating a light beam, a wavelength of the light beam being lengthened as intensity of the light beam is increased;

a first convex lens for refracting the light beam radiated from the semiconductor laser, a focal length of the first convex lens being lengthened as a wavelength of the light beam becomes longer, the first convex lens being formed of a collimator lens in which the beam light radiated from the semiconductor laser is collimated;

a refraction type of objective lens for converging the light beam refracted by the first convex lens at the information medium to read or write information from/in the information medium, a focal length of the objective lens being lengthened as the wavelength of the light beam becomes longer; and a chromatic aberration correcting element for excessively correcting chromatic aberration of the objective lens to cancel out chromatic aberration of the first convex lens, the chromatic aberration correcting element being a hologram lens functioning both as a diffraction optical element for diffracting the light beam and as a second convex lens to make a curvature of the objective lens small, a first combined focal length of both the objective lens and the hologram lens being shortened as the wavelength of the light beam becomes longer to make a second combined focal length of the objective lens, the hologram lens and the first convex lens constant and to fix a distance between a light spot of the light beam formed on the information medium and the refraction type of objective lens regardless of a change of the wavelength of the light beam, a plurality of blazed reliefs being concentrically arranged on a surface of the hologram lens to form a hologram pattern, and a center of the hologram pattern and a center of the objective lens being respectively positioned on a central line of a light path through which the light beam transmits.

2. A system according to claim 1 in which the chromatic aberration correcting element is integrally formed with the refraction type of objective lens.

3. A system according to claim 1, additionally including a light beam reshaping element for reshaping an elliptic cross section of the light beam refracted by the first convex lens into an circular cross section, a combined focal length of both the light beam reshaping element and the first convex lens in a major axis direction of the elliptic cross section differing from a combined focal length of those in a minor axis direction of the elliptic cross section to form an image on the information medium without astigmatic aberration even though an astigmatic difference occurs in the semiconductor laser, and the light beam reshaped by the light beam reshaping element transmitting through the chromatic aberration correcting element and the objective lens.

4. A system according to claim 1, additionally including a plane type of second hologram lens integrally arranged with the first convex lens for auxiliarily cancelling out the chromatic aberration of the first convex lens in cooperation with the chromatic aberration correcting element, the second hologram lens functioning as a diffraction optical element for diffracting the light beam.

5. A system according to claim 1 in which an Abbe number of the objective lens is less than 60.

6. An image-formation optical system for converging a light beam at an information medium to read or write information from/in the information medium, comprising:

a semiconductor laser for radiating a light beam, a wavelength of the light beam being lengthened as intensity of the light beam is increased;

a first convex lens for refracting the light beam radiated from the semiconductor laser, a focal length of the first convex lens being lengthened as a wavelength of the light beam becomes longer;

a refraction type of objective lens for converging the light beam refracted by the first convex lens at the information medium to read or write information from/in the information medium, a focal length of the objective lens being lengthened as the wavelength of the light beam becomes longer; and a chromatic aberration correcting element for excessively correcting chromatic aberration of the objective lens to cancel out chromatic aberration of the first convex lens, the chromatic aberration correcting element comprising a polarizing anisotropic hologram lens for diffracting the light beam which is linearly polarized in an X direction in an outgoing light path, and a quarter-wave plate for converting the light beam diffracted by the polarizing anisotropic hologram lens into a circularly-polarized-light beam in the outgoing light path and again converting the circularly-polarized-light beam of which a rotating direction is reversed on the information medium into a linearly-polarized-light beam polarized in the Y direction by the quarter-wave plate transmitting through the polarizing anisotropic hologram lens without being diffracted.

7. A system according to claim 6 in which a combined focal length of both the objective lens and the polarizing anisotropic hologram lens is shortened as the wavelength of the light beam becomes longer.

8. A system according to claim 6 in which the polarizing anisotropic hologram lens functions as a second convex lens in the outgoing light path to make small a curvature of the objective lens.

9. A system according to claim 6 in which the polarizing anisotropic hologram lens and the quarter-wave plate are integrally formed with the objective lens.

10. An image-formation optical system for converging a light beam at an information medium to read or write information from/in the information medium, comprising:

a semiconductor laser for radiating a light beam, a wavelength of the light beam being lengthened as intensity of the light beam is increased;

a first convex lens for refracting the light beam radiated from the semiconductor laser, a focal length of the first convex lens being lengthened as the wavelength of the light beam becomes longer;

a refraction type of objective lens for converging the light beam refracted by the first convex lens at the information medium to read or write information from/in the information medium, a focal length of the objective lens being lengthened as the wavelength of the light beam becomes longer;

a chromatic aberration correcting element for excessively correcting chromatic aberration of the objective lens to cancel out chromatic aberration of the first convex lens, the chromatic aberration correcting element being formed of a hologram lens functioning as a diffraction optical element for diffracting the light beam;

a polarizing anisotropic hologram lens for diffracting the light beam which is radiated from the semiconductor laser and is linearly polarized in an X direction in an outgoing light path; and a quarter-wave plate for converting the light beam diffracted by the polarizing anisotropic hologram lens into a circularly-polarized-light beam in the outgoing light path and again converting the circularly-polarized-light beam of which a rotating direction is reversed on the information medium into a linearly-polarized-light beam polarized in a Y direction perpendicular to the X-direction in an incoming light path, the circularly-polarized-light beam transmitting through the first convex lens in the outgoing light path, the circularly-polarized-light beam reflected by the information medium again transmitting through the first convex lens in the incoming light path before the circularly-polarized-light beam is converted by the quarter-wave plate, and the linearly-polarized-light beam polarized in the Y direction by the quarter-wave plate transmitting through the polarizing anisotropic hologram lens without being diffracted.

11. A system according to claim 10 in which the first convex lens is a collimator lens for collimating the beam light radiated from the semiconductor laser, and the polarizing anisotropic hologram lens functions as a second convex lens in the outgoing light path to make small a curvature of the collimator lens.

12. A system according to claim 10 in which the polarizing anisotropic hologram lens and the quarter-wave plate are integrally formed with the first convex lens.

13. An optical head apparatus for reading information from an information medium, comprising:

a semiconductor laser for radiating a light beam, a wavelength of the light beam being lengthened as intensity of the light beam is increased;

a first convex lens for refracting the light beam radiated from the semiconductor laser, a focal length of the first convex lens being lengthened as a wavelength of the light beam becomes longer, the first convex lens being formed of a collimator lens in which the beam light radiated from the semiconductor laser is collimated;

a refraction type of objective lens for converging the light beam refracted by the first convex lens at the information medium to read information stored in the information medium, a focal length of the objective lens being lengthened as the wavelength of the light beam becomes longer;

a chromatic aberration correcting element for excessively correcting chromatic aberration of the objective lens to cancel out chromatic aberration of the first convex lens, the chromatic aberration correcting element being formed of a hologram lens which functions both as a diffraction optical element for diffracting the light beam and as a second convex lens to make a curvature of the objective lens small, a first combined focal length of both the objective lens and the hologram lens being shortened as the wavelengths of the light beam becomes longer to make a second combined focal length of the objective lens, the hologram lens and the first convex lens constant and to fix a distance between a light spot of the light beam formed on the information medium and the refraction type of objective lens regardless of a change of the wavelength of the light beam, a plurality of blazed reliefs being concentrically arranged on a surface of the hologram lens to form a hologram pattern, a center of the hologram pattern and a center of the objective lens being respectively positioned on a central line of a light path through which the light beam transmits, and the hologram lens being formed of a phase type of lens; and a photo detector for detecting intensity of the light beam, which is reflected by the information medium and again transmits through the objective lens and the chromatic aberration correcting element, to obtain an information signal indicating the information stored in the information medium.

14. An apparatus according to claim 13, in which a plurality of reliefs are concentrically arranged on a surface of the hologram lens to form a hologram pattern, a height H of the reliefs is determined to maximize a diffraction efficiency of the hologram lens in a reading operation in which a wavelength $\lambda_R$ of the light beam is shorter than that in a writing operation.

15. An apparatus according to claim 14 in which the height H of the reliefs is formulated by an equation $H=\lambda_R/(n(\lambda_R)-1)$, where the symbol $n$ $(\lambda_R)$ denotes a refractive index of the hologram lens.

16. An apparatus according to claim 13, additionally including:

a refractive convex lens for converging the light beam which is reflected by the information medium and again transmits through the objective lens and the chromatic aberration correcting element, a focal length of the refractive convex lens being lengthened as the wavelength of the light beam becomes longer, and chromatic aberration of the refractive convex lens being corrected by the chromatic aberration correcting element;

a beam splitter for splitting the light beam which is reflected by the information medium and again transmits through the objective lens and the chromatic aberration correcting element, the light beam split by the beam splitter being converged by the refractive convex lens; and.

a holographic optical element arranged closely near to the refractive convex lens for auxiliarily cancelling out the chromatic aberration of the refractive convex lens in cooperation with the chromatic aberration correcting element, the light beam which transmits through the refractive convex lens and the holographic optical element being detected by the photo detector.

17. An apparatus according to claim 16 in which the holographic optical element functions as a lens to make a curvature of the refractive convex lens small.

18. An apparatus according to claim 16, additionally including:

a servo signal generating optical element partitioned into a plurality of diffracted light generation regions for converting the light beam converged by the refractive convex lens into at least one servo signal light beam, the servo signal light beams being detected by the photo detector to generate at least one servo signal; and an actuating unit for moving both the objective lens and the chromatic aberration correcting element under control of the servo signals generated in the photo detector.

19. An apparatus according to claim 18 in which a plurality of focus error detecting regions are included in the diffracted light generation regions of the servo signal generating optical element to convert the light beam into focus error signal light beams which are detected by the photo detector to generate a focus error signal, a position of a set of the objective lens and the chromatic aberration correcting element being adjusted under control of the focus error signal to reduce a focus error of the objective lens, and a first hologram pattern and a second hologram pattern being alternately formed on the focus error detecting regions.

20. An apparatus according to claim 19 in which the light beam converted in the focus error detecting regions on which the first hologram pattern is formed has a focal point positioned in the front of the photo detector, and the light beam converted in the focus error detecting regions on which the second hologram pattern is formed has another focal point positioned in the rear of the photo detector.

21. An apparatus according to claim 18 in which the servo signal generating optical element functions as a lens to make a curvature of the refractive convex lens small.

22. An apparatus according to claim 18 in which a plurality of tracking error detecting regions are included in the diffracted light generation regions of the servo signal generating optical element to convert the light beam into tracking error signal light beams which are detected by the photo detector to generate a tracking error signal, a position of a set of the objective lens and the chromatic aberration correcting element being adjusted under control of the tracking error signal to reduce a tracking error.

23. An apparatus according to claim 13, additionally including a light beam reshaping element for reshaping an elliptic cross section of the light beam refracted by the first convex lens into an circular cross section, a combined focal length of both the light beam reshaping element and the first convex lens in a major axis direction of the elliptic cross section differing from a combined focal length of those in a minor axis direction of the elliptic cross section to form an image on the information medium without astigmatic aberration even though an astigmatic difference occurs in the semiconductor laser, and the light beam reshaped by the light beam reshaping element transmitting through the chromatic aberration correcting element and the objective lens.

24. An optical information apparatus for reading or writing information from/in an information medium, comprising:

an information medium driving mechanism for rotating the information medium;

an external electric source for supplying driving power to the information driving mechanism;

an optical head apparatus comprising a semiconductor laser for radiating a light beam, a wavelength of the light beam being lengthened as intensity of the light beam is increased, a first convex lens for refracting the light beam radiated from the semiconductor laser, a focal length of the convex type of lens being lengthened as the wavelength of the light beam becomes longer, the first convex lens being formed of a collimator lens in which the beam light radiated from the semiconductor laser is collimated, a refraction type of objective lens for converging the light beam refracted by the first convex lens at the information medium to read or write information from/in the information medium, a focal length of the objective lens being lengthened as the wavelength of the light beam becomes longer, a chromatic aberration correcting element for excessively correcting chromatic aberration of the objective lens to cancel out chromatic aberration of the first convex lens, the chromatic aberration correcting element being formed of a hologram lens which functions both as a diffraction optical element for diffracting the light beam and as a second convex lens to make a curvature of the objective lens small, a first combined focal length of both the objective lens and the hologram lens being shortened as the wavelength of the light beam becomes longer to make a second combined focal length of the objective lens, the hologram lens and the first convex lens constant and to fix a distance between a light spot of the light beam formed on the information medium and the refraction type of objective lens regardless of a change of the wavelength of the light beam, a plurality of blazed reliefs being concentrically arranged on a surface of the hologram lens to form a hologram pattern, a center of the hologram pattern and a center of the objective lens being respectively positioned on a central line of a light path through which the light beam transmits, and the hologram lens being formed of a phase type of lens, a servo signal generating element for dividing the light beam, which is reflected by the information medium and again transmits through the objective lens and the chromatic aberration correcting element, into an information signal light beam and servo signal beams, a photo detector for detecting intensities of the light beams obtained in the servo signal generating element to obtain an information signal indicating the information stored in the information medium and servo signals, and an actuating unit for moving both the objective lens and the chromatic aberration correcting element under control of the servo signals generated in the photo detector;

an optical head driving apparatus for roughly positioning the objective lens of the optical head apparatus on a desired pit of the information medium; and a control circuit for generating a control signal according to the servo signals obtained in the photo detector and precisely positioning the objective lens of the optical head apparatus on the desired pit of the information medium under control of the control signal.

25. An apparatus according to claim 24 in which the servo signal generating element is a holographic optical element partitioned into a plurality of diffracted light generation regions, the information light beam being produced in a first part of the diffracted light generation regions, the focus error signal light beam being produced in a second part of the diffracted light generation regions, and the tracking error signal light beam being produced in a third part of the diffracted light generation regions.

26. An apparatus according to claim 24, additionally including a light beam reshaping element for reshaping an elliptic cross section of the light beam refracted by the convex type of lens into an circular cross section, a combined focal length of both the light beam reshaping element and the convex type of lens in a major axis direction of the elliptic cross section differing from a combined focal length of those in a minor axis direction of the elliptic cross section to form an image on the information medium without astigmatic aberration even though an astigmatic difference occurs in the semiconductor laser, and the light beam reshaped by the light beam reshaping element transmitting through the chromatic aberration correcting element and the objective lens.

27. A method for converging a light beam at an information medium to optically read or write information from/in the information medium, comprising the steps of:

collimating a light beam radiated from a semiconductor laser in a collimator lens, a wavelength of the light beam being lengthened as intensity of the light beam being increased, and a focal length of the collimator lens being lengthened as the wavelength of the light beam becomes longer;

converging the light beam collimated by the collimator lens at the information medium by use of an objective lens to read or write information from/in the information medium, a focal length of the objective lens being lengthened as the wavelength of the light beam becomes longer;

excessively correcting chromatic aberration of the objective lens by use of a hologram lens to cancel out chromatic aberration of the collimator lens, a focal length of the hologram lens being shortened as the wavelength of the light beam becomes longer;

using the hologram lens as both a diffraction optical element for diffracting the light beam and a convex lens for making a curvature of the objective lens small;

shortening a first combined focal length of both the objective lens and the hologram lens as the wavelengths of the light beam becomes longer to make a second combined focal length of the objective lens, the hologram lens and the collimator lens constant and to fix a distance between a light spot of the light beam formed on the information medium and the objective lens regardless of a change of the wavelength of the light beam;

arranging a plurality of blazed reliefs concentrically on a surface of the hologram lens to form a hologram pattern; and positioning a center of the hologram pattern and a center of the objective lens respectively on a central line of a light path through which the light beam transmits.

28. A method according to claim 27, additionally including the steps of:

reshaping an elliptic cross section of the light beam collimated by the collimator lens into an circular cross section by use of a light beam reshaping element, a combined focal length of both the light beam reshaping element and the collimator lens in a major axis direction of the elliptic cross section differing from another combined focal length of those in a minor axis direction of the elliptic cross section to prevent astigmatic aberration caused by an astigmatic difference occurring in the semiconductor laser; and transmitting the light beam reshaped by the light beam reshaping element through the hologram lens and the objective lens.

29. A method for converging a light beam at an information medium to optically read or write information from/in the information medium, comprising the steps of:

collimating a light beam radiated from a semiconductor laser in a collimator lens, a wavelength of the light beam being lengthened as intensity of the light beam being increased, and a focal length of the collimator lens being lengthened as the wavelength of the light beam becomes longer;

converging the light beam collimated by the collimator lens at the information medium by use of an objective lens to read or write information from/in the information medium, a focal length of the objective lens being lengthened as the wavelength of the light beam becomes longer; and excessively correcting chromatic aberration of the objective lens by use of a hologram lens to cancel out chromatic aberration of the collimator lens, a focal length of the hologram lens being shortened as the wavelength of the light beam becomes longer, a combined focal length of the collimator and objective lenses and the hologram lens being constant even though the wavelength of the light beam changes, the step of excessively correcting chromatic aberration including the steps of diffracting the light beam linearly polarized in an X direction in an outgoing light path by use of a polarizing anisotropic hologram lens, converting the light beam diffracted by the polarizing anisotropic hologram lens into a circularly-polarized-light beam in the outgoing light path by use of a quarter-wave plate, the circularly-polarized-light beam being converged at the information medium by the objective lens, reversing a rotating direction of the circularly-polarized-light beam on the information medium, converting the circularly-polarized-light beam reversed into a linearly-polarized-light beam polarized in a Y direction perpendicular to the X-direction in an incoming light path by use of the quarter-wave plate, transmitting the linearly-polarized-light beam polarized in the Y direction through the polarizing anisotropic hologram lens without diffracting the linearly-polarized-light beam, and feeding back the linearly-polarized-light beam to the semiconductor laser without being coupled to an active layer of the semiconductor laser, the light beam radiated from the active layer of the semiconductor laser being not adversely influenced by the linearly-polarized-light beam.

30. A method for converging a light beam at an information medium to optically read or write information from/in the information medium, comprising the steps of:

collimating a light beam radiated from a semiconductor laser in a collimator lens, a wavelength of the light beam being lengthened as intensity of the light beam being increased, and a focal length of the collimator lens being lengthened as the wavelength of the light beam becomes longer;

converging the light beam collimated by the collimator lens at the information medium by use of an objective lens to read or write information from/in the information medium, a focal length of the objective lens being lengthened as the wavelength of the light beam becomes longer;

excessively correcting chromatic aberration of the objective lens by use of a hologram lens to cancel out chromatic aberration of the collimator lens, a focal length of the hologram lens being shortened as the wavelength of the light beam becomes longer, and a combined focal length of the collimator and objective lenses and the hologram lens being constant even though the wavelength of the light beam changes;

diffracting the light beam which is radiated from the semiconductor laser and is linearly polarized in an X direction in an outgoing light path by use of a polarizing anisotropic hologram lens;

converting the light beam diffracted the polarizing anisotropic hologram lens into a circularly-polarized-light beam in the outgoing light path by use of a quarter-wave plate, the circularly-polarized-light beam being collimated by the collimator lens and being converged at the information medium by the objective lens;

reversing a rotating direction of the circularly-polarized-light beam on the information medium;

converting the circularly-polarized-light beam reversed into a linearly-polarized-light beam reversed into a linearly-polarized-light beam in a Y direction perpendicular to the X-direction in an incoming light path by use of the quarter-wave plate;

transmitting the linearly-polarizing anisotropic hologram lens without diffracting the linearly-polarized-light beam; and feeding back the linearly-polarized-light beam to the semiconductor laser without being coupled to the active layer of the semiconductor laser, the light beam radiated from the active layer of the semiconductor laser being not adversely influenced by the linearly-polarized-light beam.

31. A method for optically reading information from an information medium, comprising the steps of:

collimating a light beam radiated from a semiconductor laser in a collimator lens, a wavelength of the light beam being lengthened as intensity of the light beam being increased, and a focal length of the collimator lens being lengthened as the wavelength of the light beam becomes longer;

converging the light beam collimated by the collimator lens at the information medium by use of an objective lens to read information stored in the information medium, a focal length of the objective lens being lengthened as the wavelength of the light beam becomes longer;

excessively correcting chromatic aberration of the objective lens by use of a hologram lens to cancel out chromatic aberration of the collimator lens, a focal length of the hologram lens being shortened as the wavelength of the light beam becomes longer, using the hologram lens as both a diffraction optical element for diffracting the light beam and a convex lens for making a curvature of the objective lens small;

shortening a first combined focal length of both the objective lens and the hologram lens as the wavelength of the light beam becomes longer to make a second combined focal length of the objective lens, the hologram lens and the collimator lens constant and to fix a distance between a light spot of the light beam formed on the information medium and the objective lens regardless of a change of the wavelength of the light beam;

arranging a plurality of blazed reliefs concentrically on a surface of the hologram lens to form a hologram pattern;

positioning a center of the hologram pattern and a center of the objective lens respectively on a central line of a light path through which the light beam transmits;

transmitting the light beam through the objective lens and the hologram lens;

converging the light beam which is reflected by the information medium by use of a refractive lens, a focal length of the refractive lens being lengthened as the wavelength of the light beam becomes longer, and chromatic aberration of the refractive lens being corrected by the hologram lens; and detecting intensity of the light beam converged by the refractive lens to obtain an information signal indicating the information stored in the information medium.

32. A method according to claim 31, additionally including the steps of:

splitting the light beam which transmits through the objective lens and the hologram lens correcting element, the light beam split being converged by the refractive lens; and auxiliarily cancelling out the chromatic aberration of the refractive lens in cooperation with the hologram lens by use of a holographic optical element integrally formed with the refractive lens and the holographic optical element being detected by the photo detector.

33. A method according to claim 31, additional including the steps of:

converting the light beam converged by the refractive lens into at least one servo signal light beam by use of a servo signal generating optical element partitioned into a plurality of diffracted light generation regions, the servo signal light beams being detected by the photo detector to generate at least one servo signal, auxiliarily cancelling out the chromatic aberration of the refractive lens by cooperation between the hologram lens and a holographic optical element of the servo signal generating optical element; and moving both the objective lens and the hologram lens under control of the servo signals generated in the photo detector.

34. A method according to claim 31, additionally including the steps of:

reshaping an elliptic cross section of the light beam collimated by the collimator lens into an circular cross section by use of a light beam reshaping element, a combined focal length of both the light beam reshaping element and the collimator lens in a major axis direction of the elliptic cross section differing from another combined focal length of those in a minor axis direction of the elliptic cross section to prevent astigmatic aberration caused by an astigmatic difference occurring in the semiconductor laser; and transmitting the light beam reshaped by the light beam reshaping element through the hologram lens and the objective lens.

35. A method for optically reading information from an information medium, comprising the steps of: collimating a light beam radiated from a semiconductor laser in a collimator lens, a wavelength of the light beam being lengthened as intensity of the light beam being increased, and a focal length of the collimator lens being lengthened as the wavelength of the light beam becomes longer;

converging the light beam collimated by the collimator lens at the information medium by use of an objective lens to read information stored in the information medium, a focal length of the objective lens being lengthened as the wavelength of the light beam becomes longer;

excessively correcting chromatic aberration of the objective lens by use of a hologram lens to cancel out chromatic aberration of the collimator lens, a focal length of the hologram lens being shortened as the wavelength of the light beam becomes longer, and a combined focal length of the collimator and objective lenses and the hologram lens being constant even though the wavelength of the light beam changes, the step of excessively correcting chromatic aberration including diffracting the light beam linearly polarized in an X direction in an outgoing light path by use of a polarizing anisotropic hologram lens, converting the light beam diffracted by the polarizing anisotropic hologram lens into a circularly-polarized-light beam in the outgoing light path by use of a quarter-wave plate, the circularly-polarized-light beam being converged at the information medium by the objective lens, reversing a rotating direction of the circularly-polarized-light beam on the information medium, converting the circularly-polarized-light beam reversed into a linearly-polarized-light beam polarized in a Y direction perpendicular to the X-direction in an incoming light path by use of the quarter-wave plate, transmitting the linearly-polarized-light beam polarized in the Y direction through the polarizing anisotropic hologram lens without diffracting the linearly-polarized-light beam, and feeding back the linearly-polarized-light beam to the semiconductor laser without being coupled to an active layer of the semiconductor laser, the light beam radiated from the active layer of the semiconductor laser being not adversely influenced by the linearly-polarized-light beam;

transmitting the light beam through the objective lens and the hologram lens;

converging the light beam which is reflected by the information medium by use of a refractive lens, a focal length of the refractive lens being lengthened as the wavelength of the light beam becomes longer, and chromatic aberration of the refractive lens being corrected by the hologram lens; and detecting intensity of the light beam converged by the refractive lens to obtain an information signal indicating the information stored in the information medium.

36. A method for optically reading information from an information from an information medium, comprising the steps of:

collimating a light beam radiated from a semiconductor laser in a collimator lens, a wavelength of the light beam being lengthened as intensity of the light beam being increased, and a focal length of the collimator lens being lengthened as the wavelength of the light beam becomes longer;

converging the light beam collimated by the collimator lens at the information medium by use of an objective lens to read information stored in the information medium, a focal length of the objective lens being lengthened as the wavelength of the light beam becomes longer;

excessively correcting chromatic aberration of the objective lens by use of a hologram lens to cancel out chromatic aberration of the collimator lens, a focal length of the hologram lens being shortened as the wavelength of the light beam becomes longer, and a combined focal length of the collimator and objective lenses and the hologram lens being constant even though the wavelength of the light beam changes;

transmitting the light beam through the objective lens and the hologram lens;

converging the light beam which is reflected by the information medium by use of a refractive lens, a focal length of the refractive lens being lengthened as the wavelength of the light beam becomes longer, and chromatic aberration of the refractive lens being corrected by the hologram lens;

detecting intensity of the light beam converged by the refractive lens to obtain an information signal indicating the information stored in the information medium;

diffracting the light beam which is radiated from the semiconductor laser and is linearly polarized in an X direction in an outgoing light path by use of a polarizing anisotropic hologram lens;

converting the light beam diffracted by the polarizing anisotropic hologram lens into a circularly-polarized-light beam in the outgoing light path by use of a quarter-wave plate, the circularly-polarized-light beam being collimated by the collimator lens and being converged at the information medium by the objective lens;

reversing a rotating direction of the circularly-polarized-light beam on the information medium;

converting the circularly-polarized-light beam reversed into a linearly-polarized-light beam polarized in a Y direction perpendicular to the X-direction in an incoming light path by use of the quarter-wave plate;

transmitting the linearly-polarized-light beam polarized in the Y direction through the polarizing anisotropic hologram lens without diffracting the linearly-polarized-light beam; and feeding back the linearly-polarized-light beam to the semiconductor laser without being coupled to an active layer of the semiconductor laser, the light beam radiated from the active layer of the semiconductor laser being not adversely influenced by the linearly-polarized-light beam.

37. An optical head apparatus for reading information from an information medium, comprising:

a semiconductor laser for radiating a light beam, a wavelength of the light beam being lengthened as intensity of the light beam is increased;

a first convex lens for refracting the light beam radiated from the semiconductor laser, a focal length of the first convex lens being lengthened as the wavelength of the light beam becomes longer;

a refraction type of objective lens for converging the light beam refracted by the first convex lens at the information medium to read information stored in the information medium, a focal length of the objective lens being lengthened as the wavelength of the light beam becomes longer;

a chromatic aberration correcting element for excessively correcting chromatic aberration of the objective lens to cancel out chromatic aberration of the first convex lens, the chromatic aberration correcting element comprising a polarizing anisotropic hologram lens for diffracting the light beam which is linearly polarized in an X direction in an outgoing light path, and a quarter-wave plate for converting the light beam diffracted by the polarizing anisotropic hologram lens into a circularly-polarized-light beam in the outgoing light path and again converting the circularly-polarized-light beam of which a rotating direction is reversed on the information medium into a linearly-polarized-light beam polarized in a Y direction perpendicular to the X-direction in an incoming light path, the linearly-polarized-light beam polarized in the Y direction by the quarter-wave plate transmitting through the polarizing anisotropic hologram lens without being diffracted;

a refractive convex lens for converging the light beam which is reflected by the information medium and again transmits through the objective lens and the chromatic aberration correcting element, a focal length of the refractive convex lens being lengthened as a wavelength of the light beam becomes longer, and chromatic aberration of the refractive convex lens being corrected by the chromatic aberration correcting element; and a photo detector for detecting intensity of the light beam converged by the refractive convex lens to obtain an information signal indicating the information stored in the information medium.

38. An optical information apparatus for reading or writing information from/in an information medium, comprising:

an information medium driving mechanism for rotating the information medium;

an external electric source for supplying driving power to the information driving mechanism;

an optical head apparatus comprising
- a semiconductor laser for radiating a light beam, a wavelength of the light beam being lengthened as intensity of the light beam is increased,
- a first convex lens for refracting the light beam radiated from the semiconductor laser, a focal length of the convex type of lens being lengthened as a wavelength of the light beam becomes longer,
- a refraction type of objective lens for converging the light beam refracted by the first convex lens at the information medium to read or write information from/in the information medium, a focal length of the objective lens being lengthened as the wavelength of the light beam becomes longer,
- a chromatic aberration correcting element for excessively correcting chromatic aberration of the objective lens to cancel out chromatic aberration of the first convex lens,
- the chromatic aberration correcting element comprising:
  - a polarizing anisotropic hologram lens for diffracting the light beam which is linearly polarized in an X direction in an outgoing light path, and
  - a quarter-wave plate for converting the light beam diffracted by the polarizing anisotropic hologram lens into a circularly-polarized-light beam in the outgoing light path and again converting the circularly-polarized-light beam of which a rotating direction is reversed on the information medium into a linearly-polarized-light beam polarized in a Y direction perpendicular to the X-direction in an incoming light path, the linearly-polarized-light beam polarized in the Y direction by the quarter-wave plate transmitting through the polarizing anisotropic hologram lens without being diffracted;
- a refractive convex lens for converging the light beam which is reflected by the information medium and again transmits through the objective lens and the chromatic aberration correcting element, a focal length of the refractive convex lens being lengthened as the wavelength of the light beam becomes longer, and chromatic aberration of the refractive convex lens being corrected by the chromatic aberration correcting element,
- a servo signal generating element for dividing the light beam converged by the refractive convex lens into an information signal light beam and servo signal beams,
- a photo detector for detecting intensities of the light beams obtained in the servo signal generating element to obtain an information signal indicating the information stored in the information medium and servo signals,
- an actuating unit for moving both the objective lens and the chromatic aberration correcting element under control of the servo signals generated in the photo detector;

an optical head driving apparatus for roughly positioning the objective lens of the optical head apparatus on a desired pit of the information medium; and a control circuit for generating a control signal according to the servo signals obtained in the photo detector and precisely positioning the objective lens of the optical head apparatus on the desired pit of the information medium under control of the control signal.

* * * * *